US012138947B2

(12) United States Patent
Dalton et al.

(10) Patent No.: US 12,138,947 B2
(45) Date of Patent: Nov. 12, 2024

(54) SUBLIMATION SYSTEMS AND RELATED METHODS

(71) Applicant: Cricut, Inc., South Jordan, UT (US)

(72) Inventors: John Dalton, South Jordan, UT (US); Cole Chamberlain, American Fork, UT (US); Ashish Arora, South Jordan, UT (US)

(73) Assignee: Cricut, Inc., South Jordan, UT (US)

( * ) Notice: Subject to any disclaimer, the term of this patent is extended or adjusted under 35 U.S.C. 154(b) by 0 days.

(21) Appl. No.: 18/440,536

(22) Filed: Feb. 13, 2024

(65) Prior Publication Data

US 2024/0181796 A1 Jun. 6, 2024

Related U.S. Application Data

(63) Continuation of application No. 17/809,499, filed on Jun. 28, 2022, now Pat. No. 11,932,040, which is a continuation of application No. 17/177,965, filed on Feb. 17, 2021, now Pat. No. 11,407,245.

(51) Int. Cl.

| | |
|---|---|
| ***H05B 1/00*** | (2006.01) |
| ***B41F 16/00*** | (2006.01) |
| ***B41M 5/035*** | (2006.01) |
| ***F24H 9/18*** | (2022.01) |
| ***H05B 1/02*** | (2006.01) |

(52) U.S. Cl.

CPC ....... *B41M 5/0358* (2013.01); *B41F 16/0086* (2013.01); *F24H 9/18* (2013.01); *H05B 1/00* (2013.01); *H05B 1/0227* (2013.01)

(58) Field of Classification Search

None

See application file for complete search history.

(56) References Cited

U.S. PATENT DOCUMENTS

| | | | | |
|---|---|---|---|---|
| 4,874,454 A * | 10/1989 | Talalay | B65C 9/34 156/481 |
| 5,108,537 A * | 4/1992 | Garnes | B65C 3/16 156/215 |
| 5,170,704 A * | 12/1992 | Warren | B41F 17/20 156/583.1 |

(Continued)

FOREIGN PATENT DOCUMENTS

| | | |
|---|---|---|
| CA | 2027976 A1 | 4/1991 |
| CN | 101229743 A | 7/2008 |

(Continued)

OTHER PUBLICATIONS

International Search Report and Written Opinion, relating to Applicaiton No. PCT/US2022/016373, dated May 31, 2022.

(Continued)

*Primary Examiner* — Thor S Campbell

(74) *Attorney, Agent, or Firm* — Honigman LLP; Grant Griffith

(57) ABSTRACT

A sublimation device includes a first heater and a second heater. The first heater includes a proximal end, a distal end, and an inner surface. The distal end is disposed opposite the proximal end. The inner surface extends between the proximal end and the distal end and at least partially forms a cavity. The second heater is disposed proximate the distal end of the first heater.

11 Claims, 26 Drawing Sheets

(56) References Cited

U.S. PATENT DOCUMENTS

| | | | | | |
|---|---|---|---|---|---|
| 5,296,081 | A * | 3/1994 | Morin | B65C 9/24 | 219/535 |
| 5,382,313 | A * | 1/1995 | Eminger | B41F 16/00 | 269/271 |
| 5,558,888 | A * | 9/1996 | Beck | B29C 45/1782 | 425/549 |
| 5,584,961 | A * | 12/1996 | Ellsworth | B65C 9/24 | 156/583.8 |
| 5,622,577 | A * | 4/1997 | O'Connor | B22F 10/28 | 264/308 |
| 5,630,894 | A * | 5/1997 | Koch | B65C 9/24 | 156/286 |
| 5,711,837 | A * | 1/1998 | Kantrowitz | B44C 1/1712 | 156/215 |
| 5,714,738 | A * | 2/1998 | Hauschulz | F16L 53/35 | 219/535 |
| 5,755,921 | A * | 5/1998 | Christensen | B41F 16/00 | 156/391 |
| 5,802,969 | A * | 9/1998 | Wess | B41M 5/0358 | 156/240 |
| 5,876,547 | A | 3/1999 | Kiesow et al. | | |
| 5,944,931 | A * | 8/1999 | Cranford | B41F 16/0086 | 156/247 |
| 6,025,577 | A * | 2/2000 | Schwarzkopf | B29C 45/74 | 392/397 |
| 6,043,466 | A * | 3/2000 | Jenko | B29C 45/1782 | 219/535 |
| 6,146,576 | A * | 11/2000 | Blackmore | B29C 66/496 | 425/389 |
| 6,163,016 | A * | 12/2000 | Johnson | B29C 45/1782 | 219/535 |
| 6,186,207 | B1 * | 2/2001 | Berghauser | C04B 41/009 | 156/583.1 |
| 6,230,774 | B1 * | 5/2001 | Ward | B41F 16/0086 | 156/359 |
| 6,264,783 | B1 * | 7/2001 | Oez | B44C 1/1712 | 156/275.7 |
| 6,743,109 | B2 * | 6/2004 | Kammerer, Jr. | B44C 1/1712 | 156/247 |
| 7,241,131 | B1 * | 7/2007 | Booth | B29C 45/74 | 425/549 |
| 10,361,019 | B2 * | 7/2019 | Russegger | H01C 17/00 | |
| 11,407,245 | B1 | 8/2022 | Dalton et al. | | |
| 11,932,040 | B2 * | 3/2024 | Dalton | H05B 1/00 | |
| 2007/0214974 | A1 | 9/2007 | Goss et al. | | |
| 2017/0144466 | A1 | 5/2017 | Anping et al. | | |
| 2022/0266618 | A1 | 8/2022 | Barney et al. | | |

FOREIGN PATENT DOCUMENTS

| | | | |
|---|---|---|---|
| CN | 205167838 | U | 4/2016 |
| CN | 211138510 | U | 7/2020 |
| WO | 2020247368 | A1 | 12/2020 |

OTHER PUBLICATIONS

USPTO, Office Action relating to U.S. Appl. No. 17/177,965, dated Nov. 16, 2021.

International Search Report and Written Opinion, relating to Application No. PCT/US2022/016374, dated Jul. 12, 2022.

USPTO. Office Action relating to U.S. Appl. No. 17/179,941, dated Aug. 21, 2023.

USPTO. Office Action relating to U.S. Appl. No. 17/809,499, dated Jul. 20, 2023.

* cited by examiner

SUBLIMATION SYSTEMS AND RELATED METHODS

CROSS REFERENCE TO PRIOR APPLICATIONS

This U.S. patent application is a continuation of, and claims priority under 35 U.S.C. § 120 from, U.S. patent application Ser. No. 17/809,499, filed on Jun. 28, 2022, which is a continuation of U.S. patent application Ser. No. 17/177,965, filed on Feb. 17, 2021, now U.S. Pat. No. 11,407,245. The disclosures of these prior applications are considered part of the disclosure of this application and are hereby incorporated by reference in their entireties.

TECHNICAL FIELD

The present disclosure relates generally to sublimation systems, methods, and devices. In particular, the present disclosure relates to heat press systems, methods, and devices configured for ink sublimation.

BACKGROUND

This section provides background information related to the present disclosure and is not necessarily prior art.

Heat presses and other sublimation devices are used to create artwork on a workpiece (e.g., a mug) via sublimation by applying a transfer sheet of infusible ink onto a surface of the workpiece and applying heat and pressure. The sublimation process is responsive to temperature, pressure, and duration such that variations in temperature, pressure, or time applied to the transfer sheet against the surface of the workpiece results in variations in ink transfer. For example, uneven heat distribution to the surface of the workpiece during sublimation may result in cooler surface portions, which causes less ink to transfer to the workpiece at those portions, which results in faded or dimmed portions of the transferred artwork on the surface of the workpiece.

An even distribution of heat onto the surface of a workpiece from the sublimation device may be difficult when, for example, differently sized workpieces having different geometries are interfaced with the sublimation device. Furthermore, the sublimation device may be subjected to a variety of ambient temperature conditions. Because of these difficulties, conventional sublimation devices result in uneven and inconsistent transfers of designs onto workpieces such that unsightly fading and dimming of the transferred designs appear on the workpiece.

Accordingly, there are a number of disadvantages in the art that can be addressed.

SUMMARY

This section provides a general summary of the disclosure, and is not a comprehensive disclosure of its full scope or all of its features.

Implementations of the present disclosure relate generally to heat press systems, methods, and apparatus. In particular, the present disclosure relates to ink sublimation mug presses. For example, in one implementation of the present disclosure, a mug press includes a heater at least partially defining a receptacle and a base heater disposed at the bottom of the receptacle.

In one implementation of the present disclosure, the base heater comprises a top surface; and the top surface of the base heater is disposed perpendicular to a major axis of the receptacle.

In one implementation of the present disclosure, the heater comprises two or more distinct heat zones.

In one implementation of the present disclosure, the mug press further comprises an outer casing and an insulative layer disposed between the base heater and the outer casing.

In one implementation of the present disclosure, the mug press includes a power supply or other electronic components in communication with the base heater within the mug press are separated from the base heater by the insulative barrier.

One aspect of the disclosure provides a sublimation device. The sublimation device includes a first heater and a second heater. The first heater includes a proximal end, a distal end, and an inner surface. The distal end is disposed opposite the proximal end. The inner surface extends between the proximal end and the distal end and at least partially forms a cavity. The second heater is disposed proximate the distal end of the first heater.

Implementations of this aspect of the disclosure may include one or more of the following optional features. In some implementations, the cavity includes a major axis surrounded by the inner surface of the first heater. The second heater may include a top surface disposed perpendicular to the major axis.

In some implementations, the first heater includes two or more distinct heat zones. At least one of the two or more distinct heat zones may extend vertically along a side edge of the first heater such that the at least one of the two or more heat zones is configured to contact a portion of an outer surface of a workpiece adjacent to a flange of the workpiece when the workpiece is placed into the cavity. The two or more distinct heat zones may include a first side heat zone, a second side heat zone, and a middle heat zone. The first side heat zone may extend vertically along a first side edge of the first heater. The second side heat zone may extend vertically along a second side edge of the first heater. The middle heat zone may be disposed between the first side heat zone and the second side heat zone.

In some implementations, the second heater is configured to face a bottom surface of a workpiece when the workpiece is placed into the cavity.

In some implementations, the cavity is cylindrical.

In some implementations, the first heater forms a gap that is configured to receive a flange portion extending from a workpiece when the workpiece is placed into the cavity.

In some implementations, the cavity is open at the proximal end and closed at the distal end. The first heater may form a vertical sidewall defining at least a portion of the cavity. An upper surface of the second heater may define at least a portion of a closed bottom of the cavity.

In some implementations, the sublimation device includes an outer casing and an insulative layer disposed between the second heater and the outer casing. The insulative layer may be disposed below the second heater.

In some implementations, the second heater is disposed within the cavity.

In some implementations, the first heater at least partially surrounds the second heater.

Another aspect of the disclosure provides a method of sublimating ink on a workpiece. The method may include activating a first heater. The method may also include transmitting, in a first direction, a first heat flow from the first heater during a first time period. The method may further include activating a second heater. The method may also include transmitting, in a second direction, a second heat flow from the second heater during at least a portion of the first time period.

Implementations of this aspect of the disclosure may include one or more of the following optional features. In some implementations, the first direction is orthogonal to the second direction. The first direction may extend radially, and the second direction may extend axially. The first heater may at least partially define a cavity. The method may further include disposing a workpiece within the cavity. The method may further include transmitting, in the second direction, a third heat flow from the first heater during the first time period. A first portion of the third heat flow may be disposed on a first axial side of the second heater, and a second portion of the third heat flow may be disposed on a second axial side of the second heater.

The details of one or more implementations of the disclosure are set forth in the accompanying drawings and the description below. Other aspects, features, and advantages will be apparent from the description and drawings, and from the claims.

Each of the above independent aspects of the present disclosure, and those aspects described in the detailed description below, may include any of the features, options, and possibilities set out in the present disclosure and figures, including those under the other independent aspects, and may also include any combination of any of the features, options, and possibilities set out in the present disclosure and figures.

Additional features and advantages of exemplary aspects of the disclosure will be set forth in the description which follows, and in part will be obvious from the description, or may be learned by the practice of such exemplary aspects. The features and advantages of such aspects may be realized and obtained by means of the instruments and combinations particularly pointed out in the appended claims. These and other features will become more fully apparent from the following description and appended claims or may be learned by the practice of such exemplary aspects as set forth hereinafter.

DESCRIPTION OF DRAWINGS

In order to describe the manner in which the above-recited and other advantages and features of the present disclosure can be obtained, a more particular description of the present disclosure briefly described above will be rendered by reference to specific implementations thereof which are illustrated in the appended drawings. Understanding that these drawings depict only typical implementations of the present disclosure and are not therefore to be considered to be limiting of its scope, the present disclosure will be described and explained with additional specificity and detail through the use of the accompanying drawings in which.

Corresponding reference numerals indicate corresponding parts throughout the drawings.

DETAILED DESCRIPTION

The present disclosure relates generally to sublimation systems and devices and methods for using the same. In some instances, a workpiece (e.g., a mug) is removably-secured within a cavity of a sublimation device (e.g., a heat press) described in the present disclosure for transferring a sublimation ink from a sheet to the workpiece. Implementations of the present disclosure provide technical solutions to a number of technical problems in the art.

In some configurations, the sublimation device includes one or more heating devices. The one or more heating devices may work in conjunction to evenly distribute heat across an outer side surface of the workpiece.

In some implementations, exemplary configurations of the sublimation device may evenly distribute heat across the outer surface of the workpiece regardless of one or more sources of heat loss. In some instances, the heat loss may arise from, for example, conductive heat losses or convective heat losses. Such losses may arise from, for example, the configuration of the workpiece itself, or by, for example, airflow of the ambient air surrounding the sublimation device during a workpiece sublimation process.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

With reference to FIGS. 1-6, implementations of the present disclosure relate generally to a sublimation device 10, components thereof, and methods of use. As seen at FIGS. 1 and 3-5, the sublimation device 10 is sized for receiving a plurality of differently sized workpieces W of a similar type or species.

Figure 1:
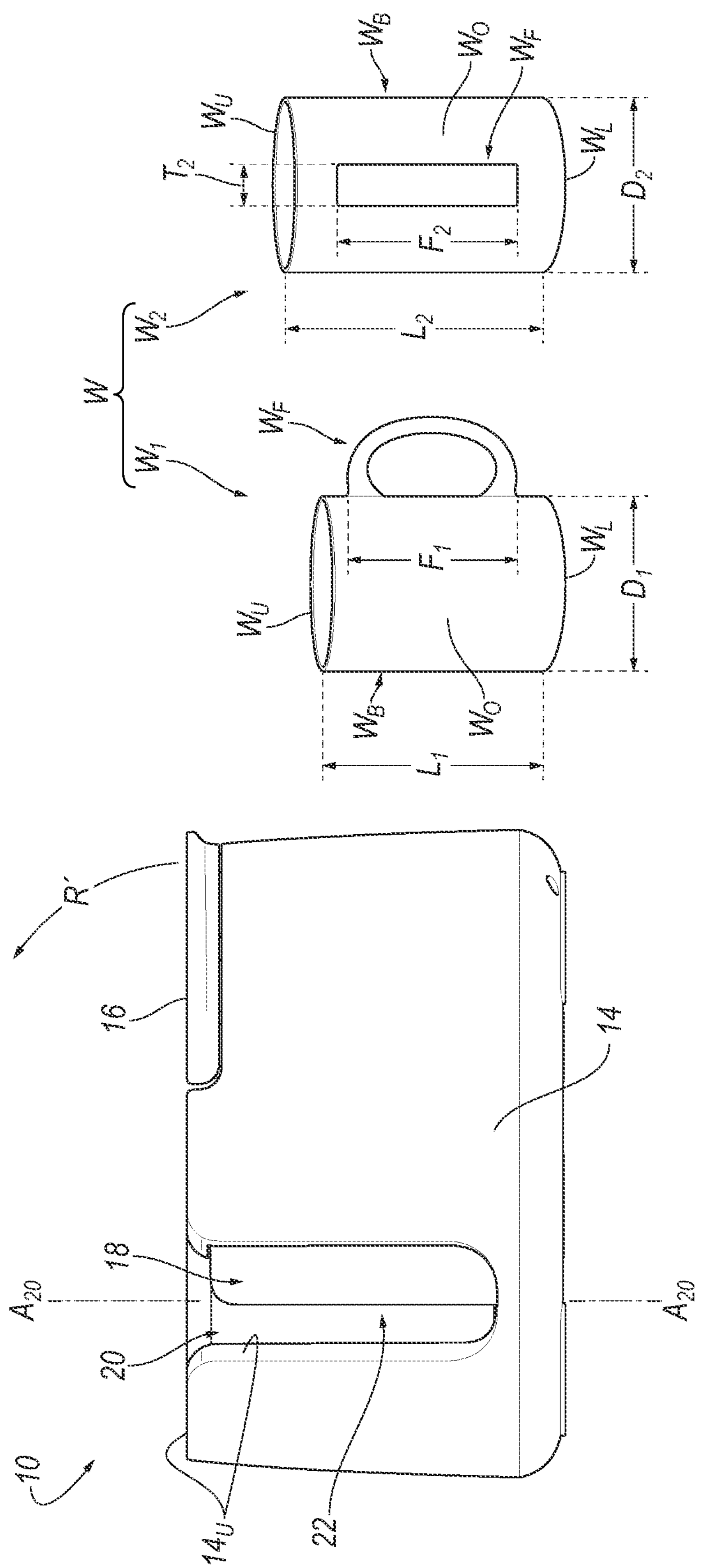
FIG. 1 is a front view of a sublimation device and two exemplary workpieces, according to the principles of the present disclosure.

Referring to FIG. 1, the plurality of differently sized workpieces W are generally represented by a first workpiece $W_1$ and a second workpiece $W_2$. Both of the first workpiece $W_1$ and the second workpiece $W_2$ may be of the same type or same species, and may each include a body portion WB and a handle or flange portion $W_F$. In some examples, the second workpiece $W_2$ may include, for example, one or both of a larger length $L_2$ and a larger diameter $D_2$ when compared to, for example, a length $L_1$ and a diameter $D_1$ of the first workpiece $W_1$. In other examples, second workpiece $W_2$ may include, for example, one or both of a longer flange length $F_2$ and a thicker flange thickness $T_2$ (see, e.g., FIGS. 1 and 5) when compared to, for example, a flange length $F_1$ and a flange thickness $T_1$ (see, e.g., FIGS. 3-4) of the first workpiece $W_1$.

The plurality of differently sized workpieces W may include any desirable configuration that provides any desirable function. In some instances, the body portion WB of the plurality of differently sized workpieces W may be shaped to retain, for example, a liquid, solid, or semi-solid. Accordingly, the plurality of differently sized workpieces W may be a vase, bowl, beverage container, or the like. In this regard, while the workpieces W are generally shown and described herein as being mugs, it will be appreciated that the sublimation device 10 may utilize other workpieces W within the scope of the present disclosure. The plurality of differently sized workpieces W may include any desirable material such as, for example, a ceramic material. Although the plurality of differently sized workpieces W are shown and described to include the flange portion $W_F$, the plurality of differently sized workpieces W may be configured to not include the flange portion $W_F$.

Referring to FIGS. 1-6, the exemplary sublimation device 10 may be configured to transfer heat H (see, e.g., FIGS. 20 and 21B) to an outer side surface $W_O$ of one or more workpieces $W_1$, $W_2$ of the plurality of differently sized workpieces W for sublimating a design, which may be alternatively referred to as artwork A (see, e.g., FIGS. 19A-19H, 20A, and 20B) onto the outer side surface $W_O$ of one or more workpieces $W_1$, $W_2$ of the plurality of differently sized workpieces W. In at least one implementation, the sublimation device 10 may be configured to apply not only the heat H, but, also a force or pressure P (see, e.g., FIG. 20A) to a transfer sheet S that includes infusible sublimation ink I that forms the design A. Accordingly, as will be described in the following disclosure at FIGS. 19B-19D, the transfer sheet S may be removably-applied to the outer side surface $W_O$ of one or more workpieces $W_1$, $W_2$ of the plurality of differently sized workpieces W prior to being placed into the sublimation device 10. Once placed within and subsequently activating the sublimation device 10, the infusible sublimation ink I that is arranged adjacent the outer side surface $W_O$ of one or more workpieces $W_1$, $W_2$ of the plurality of differently sized workpieces W is sublimated or infused onto the outer side surface $W_O$ of one or more workpieces $W_1$, $W_2$ of the plurality of differently sized workpieces W.

In some configurations, the sublimation device 10 may be actuated or powered on upon pressing a button 12 (see, e.g., FIGS. 2 and 6) that extends through a passage formed by an outer housing 14. The sublimation device 10 may further include a workpiece engagement actuator (e.g., a handle) that is seen generally at 16. Movement of the workpiece engagement actuator 16 to/from a first orientation (see, e.g., FIG. 3) and a second orientation (see, e.g., FIGS. 1-2 and 4-6) results in corresponding movement of a workpiece-engaging device (e.g., a clamp), which is seen generally at 18 to/from an disengaged orientation (see, e.g., FIG. 3) and an engaged or engaging orientation (see, e.g., FIGS. 1-2 and 4-6). As seen at FIG. 6, the workpiece engagement actuator 16 may be rotatable (see, e.g. arrow R' at FIGS. 1-2 and 4-5 and arrow R at FIG. 3) about an axis $A_{16}$-$A_{16}$; accordingly, the workpiece engagement actuator 16 is configured to be selectively rotated: (1) according to the direction of arrow R' about the axis $A_{16}$-$A_{16}$ in a first direction for arranging the workpiece engagement actuator 16 in an up orientation (see, e.g., FIG. 3) relative to the outer housing 14; and (2) according to the direction of the arrow R about the axis $A_{16}$-$A_{16}$ in a second direction (that is opposite the first direction R') for arranging the workpiece engagement actuator 16 in a down orientation (see, e.g., FIGS. 1-2 and 4-6) relative to the outer housing 14.

Figure 7:
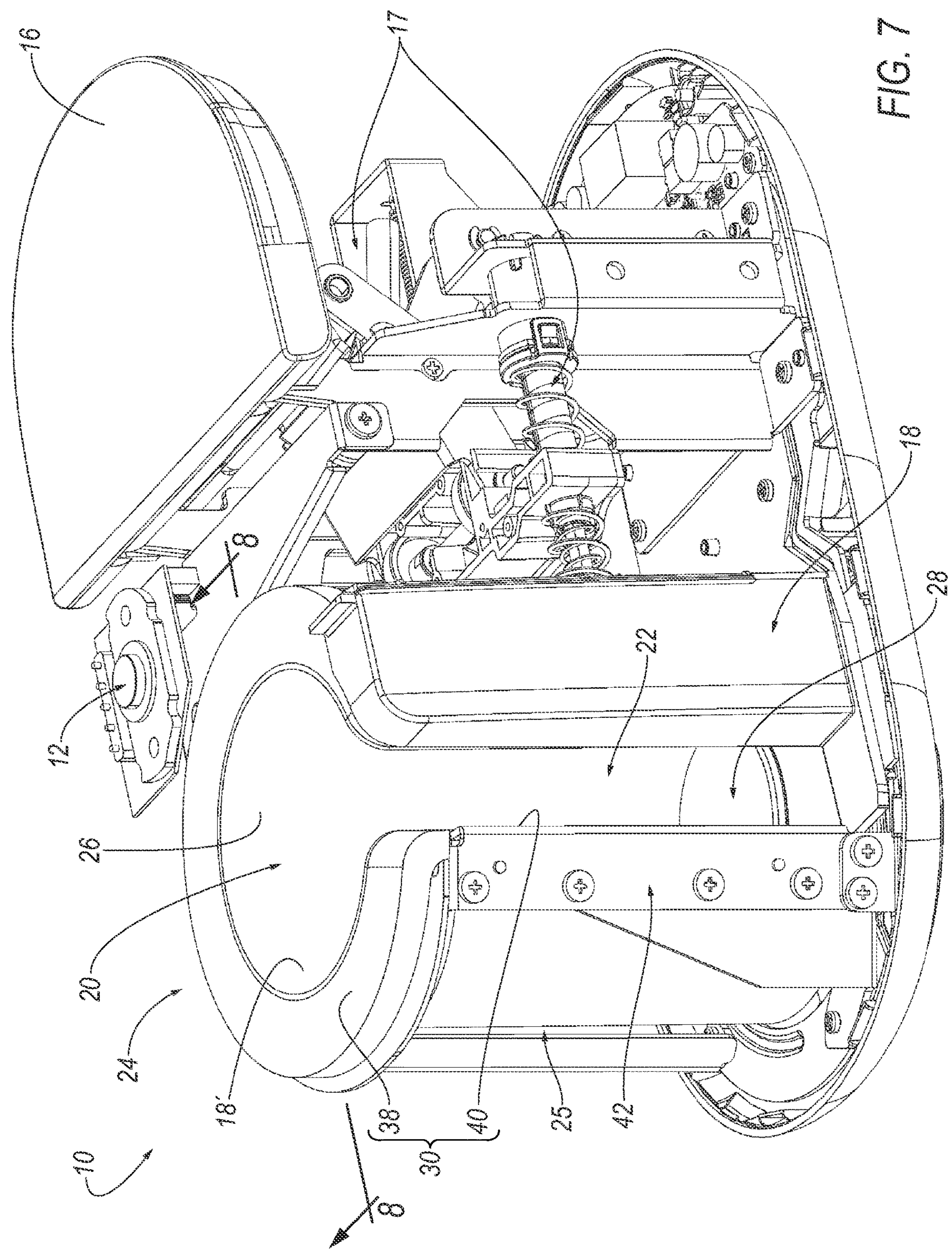
FIG. 7 is a top perspective view of the sublimation device of FIGS. 1-2 with an outer housing removed, according to the present disclosure.

With reference to FIG. 7, the workpiece engagement actuator 16 may be connected to the workpiece-engaging device 18 by way of an intervening connecting structure 17 in such a way that: (1) the raising of the workpiece engagement actuator 16 to the up orientation disengages, releases, or "opens" the workpiece-engaging device 18; and (2) the lowering of the workpiece engagement actuator 16 engages or "closes" the workpiece-engaging device 18. Alternatively, in some configurations, the workpiece-engaging device 18 may be "opened" by pushing the workpiece engagement actuator 16 downward, and, in an opposite manner, a lifting motion of the workpiece engagement actuator 16 in an upwardly direction may cause the workpiece-engaging device 18 to be "closed".

Figure 2:
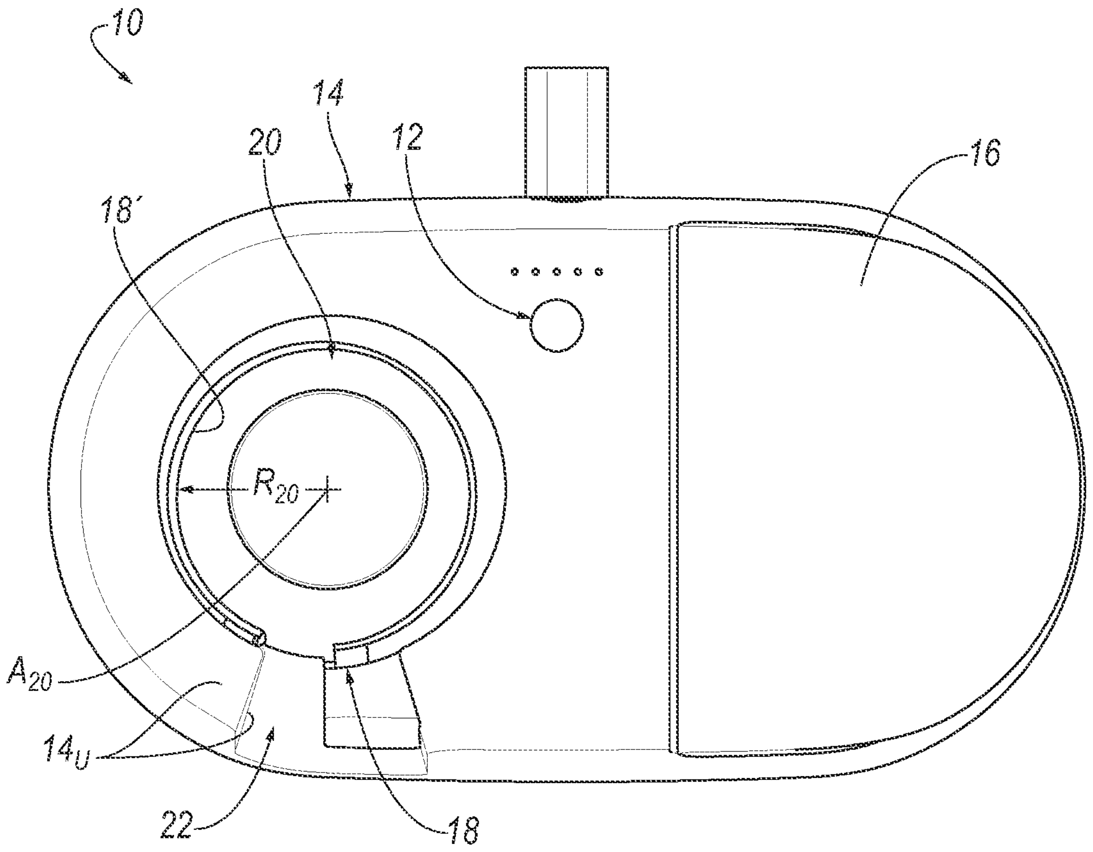
FIG. 2 is a top view of the sublimation device of FIG. 1.

With reference to FIGS. 1 and 2, in some implementations, the workpiece-engaging device 18 includes a wall 18' formed generally into a cylindrical configuration defining a substantially cylindrical cavity 20. As the workpiece engagement actuator 16 is moved up R' or down R during use, the material (e.g., wall 18') of workpiece-engaging device 18 is manipulated such that the circumference of the wall 18' defining the cavity 20 expands (e.g., radially) or contracts (e.g., radially). For example, radius $R_{20}$ may be maximized when the workpiece engagement actuator 16 is moved up R' or minimized when the workpiece engagement actuator 16 is moved down R. The radius $R_{20}$ that is generally defined by the substantially cylindrical cavity 20 may be referenced from a central axis $A_{20}$-$A_{20}$ (see, e.g., FIGS. 1 and 3), extending through an axial center of the cavity 20. When arranged in the engaged or "closed" orientation, the workpiece-engaging device 18 applies a circumferential force or pressure P in a radial direction toward the central axis $A_{20}$-$A_{20}$ against the outer side surface $W_O$ of one of the workpieces $W_1$, $W_2$ of the plurality of differently sized workpieces W that may be placed within the cavity 20.

Figure 3:
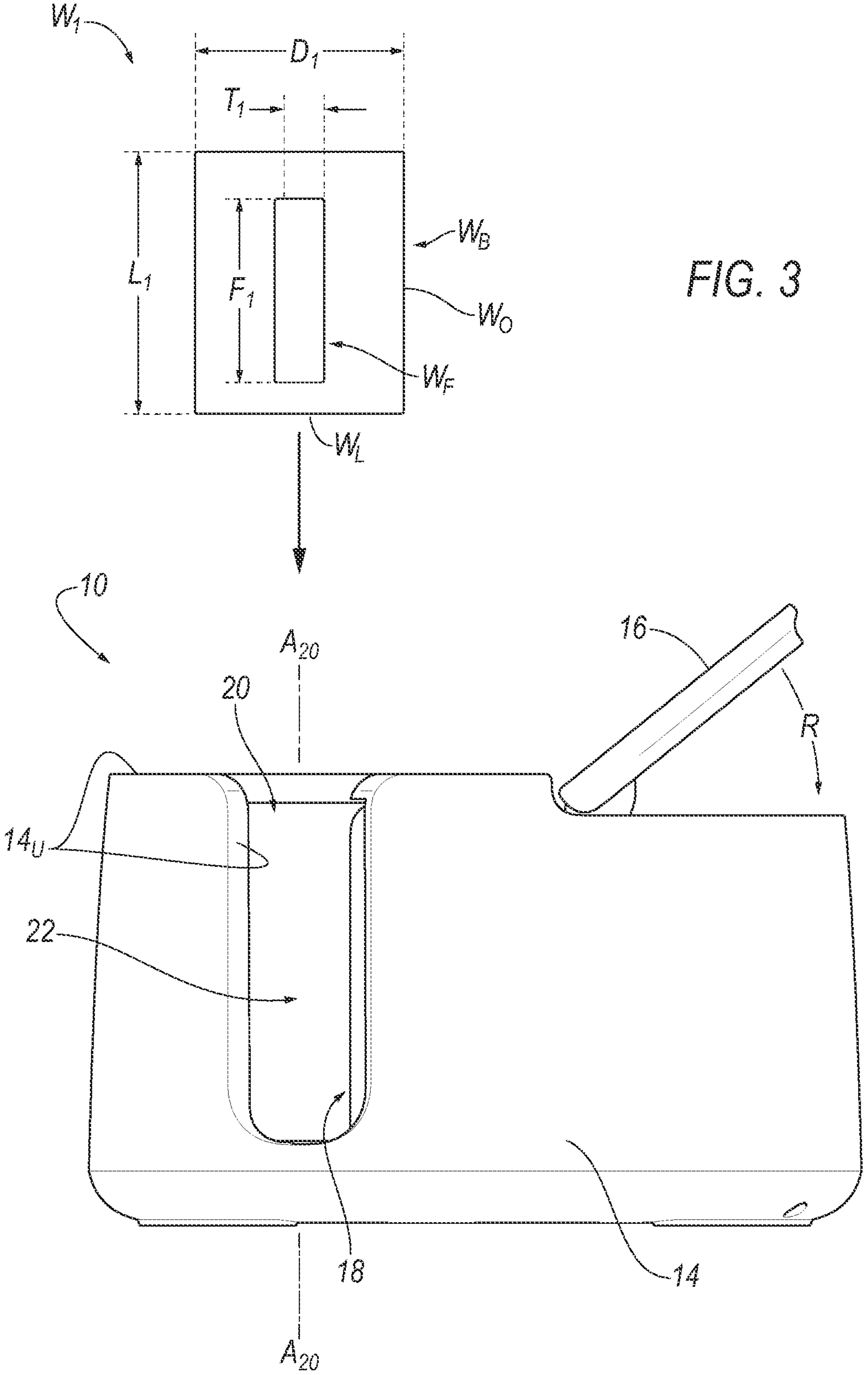
FIG. 3 is a front view of the sublimation device of FIG. 1 showing a first workpiece arranged proximate a cavity of the sublimation device that is sized to receive either of, for example, the first workpiece or a second workpiece while a workpiece-engaging device of the sublimation device is arranged in a disengaged orientation, according to the present disclosure.

Also, in some implementations, the workpiece-engaging device 18 may not entirely form a cylindrical configuration, providing an axial gap 22 that also extends radially though the outer housing 14. As seen at FIGS. 1 and 3, a portion of an upper trim surface **14*r* that may trim the outer housing 14 forms a substantially U-shape (see, e.g., FIGS. 1 and 3), and, a portion of the workpiece-engaging device 18 may collectively form the gap 22. During use, the gap 22 may provide a space through which, for example, the flange portion $W_F$ of one of the workpieces $W_1$, $W_2$ of the plurality of differently sized workpieces W may protrude after one of the workpieces $W_1$, $W_2$ of the plurality of differently sized workpieces W is axially placed into cavity 20 along the central axis $A_{20}$-$A_{20}$. As seen at FIG. 3, when the workpiece engagement actuator 16 is arranged in a disengaged, upward position, the workpiece-engaging device 18 may be said to be arranged in an "open" orientation such that one of the workpieces $W_1$, $W_2$ of the plurality of differently sized workpieces W may be inserted into the cavity 20. Furthermore, as seen at FIG. 3, in some instances, prior to axially inserting one of the workpieces $W_1$, $W_2$ of the plurality of differently sized workpieces W into the cavity 20, the flange portion $W_F$ of one of the workpieces $W_1$, $W_2$ of the plurality of differently sized workpieces W may be axially aligned with the gap 22**.

With reference to FIG. 3, after one of the workpieces $W_1$, $W_2$ of the plurality of differently sized workpieces W is arranged within the cavity 20, the workpiece engagement actuator 16 may be rotated according to the direction of the arrow R for subsequent arrangement in the "down" orientation or "closed" position so that workpiece-engaging device 18 "closes" for circumferentially engaging and compressing one of the workpieces $W_1$, $W_2$ of the plurality of differently sized workpieces W within the cavity 20. As noted above, the circumference of the cavity 20 reduces (e.g., the radius $R_{20}$ that is generally defined by the cavity 20 is reduced) when workpiece-engaging device 18 is arranged in the engaged orientation or "closed" position so that when one of the workpieces $W_1$, $W_2$ of the plurality of differently sized workpieces W is first placed within the cavity 20, the material of the workpiece-engaging device 18 forming the cylindrical wall that forms the cavity 20 presses against the outer side surface $W_O$ of one of the workpieces $W_1$, $W_2$ of the plurality of differently sized workpieces W.

Figure 4:
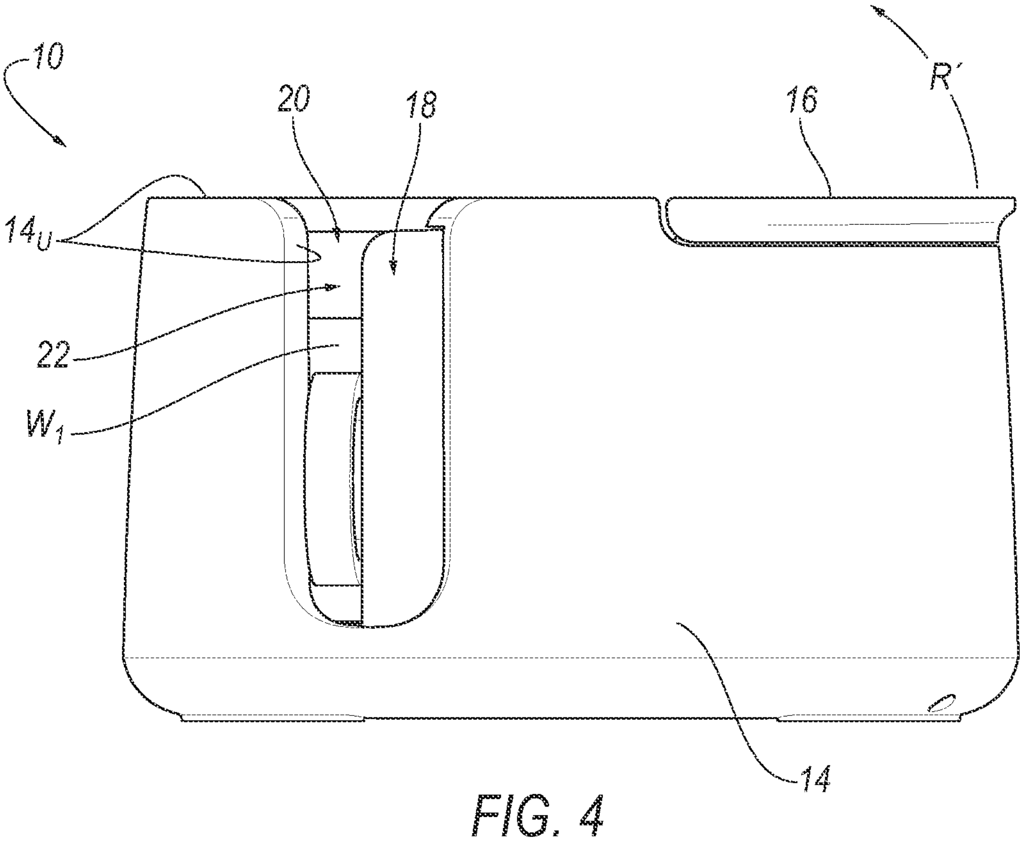
FIG. 4 is another front view of the sublimation device according to FIG. 3 showing the first workpiece arranged within the cavity of the sublimation device while the workpiece-engaging device is arranged in an engaged orientation, according to the present disclosure.
Figure 5:
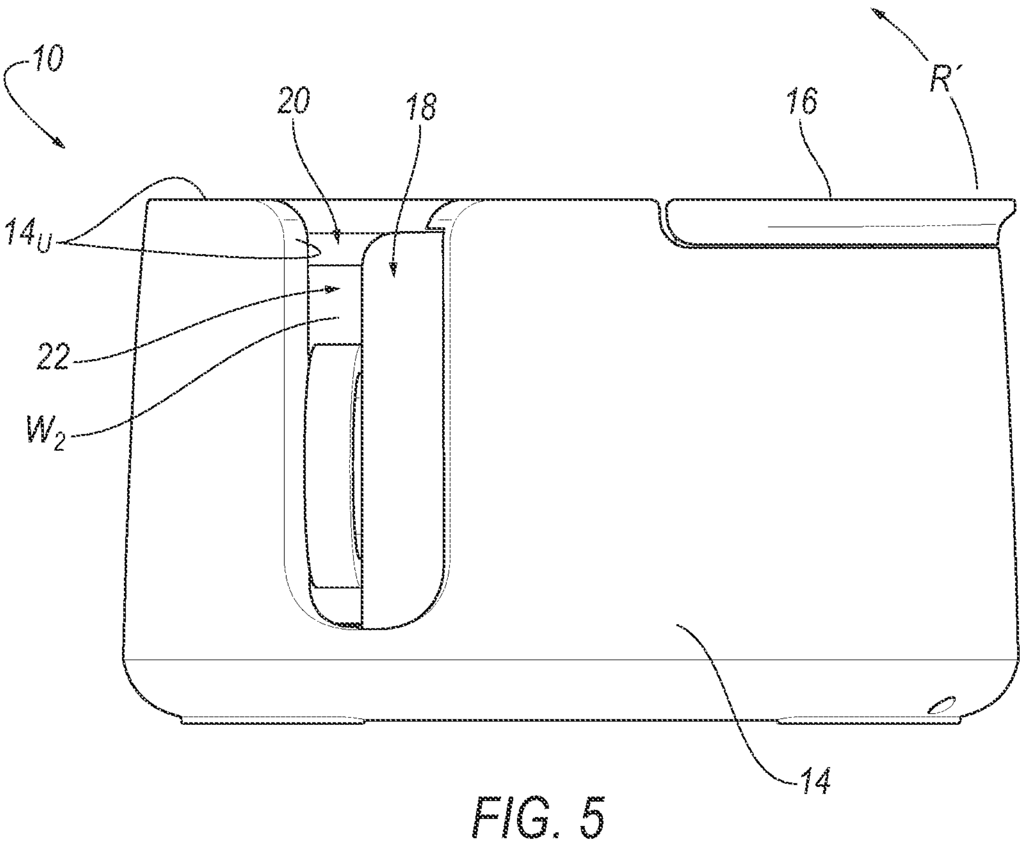
FIG. 5 is another front view of the sublimation device according to FIG. 3 showing the second workpiece arranged within the cavity of the sublimation device while the workpiece-engaging device is arranged in an engaged orientation, according to the present disclosure.
Figure 6:
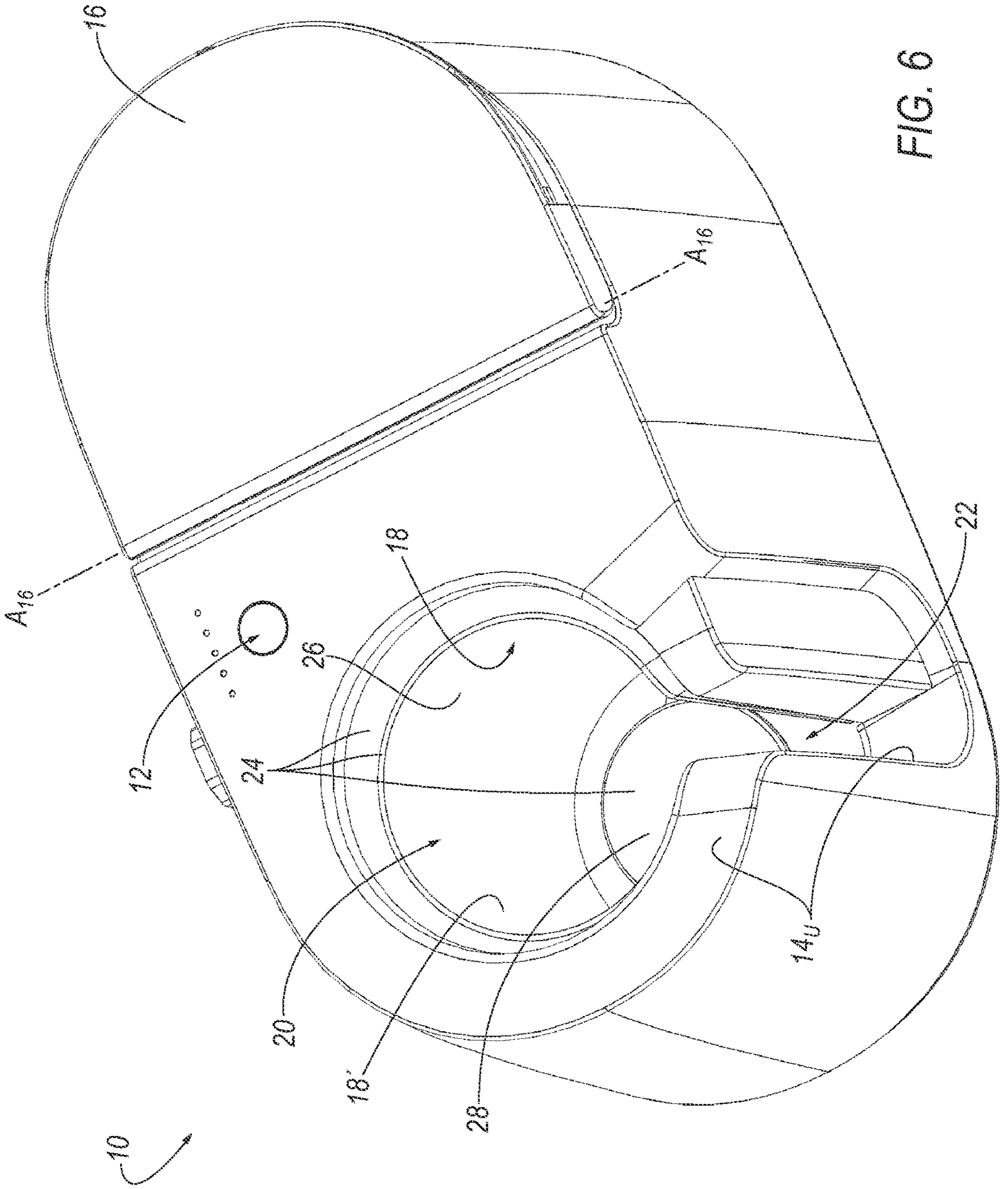
FIG. 6 is a top perspective view of the sublimation device of FIGS. 1-2 showing the workpiece-engaging device arranged in an engaged orientation while a workpiece is not arranged within the cavity of the sublimation device, according to the present disclosure.
Figure 19A:
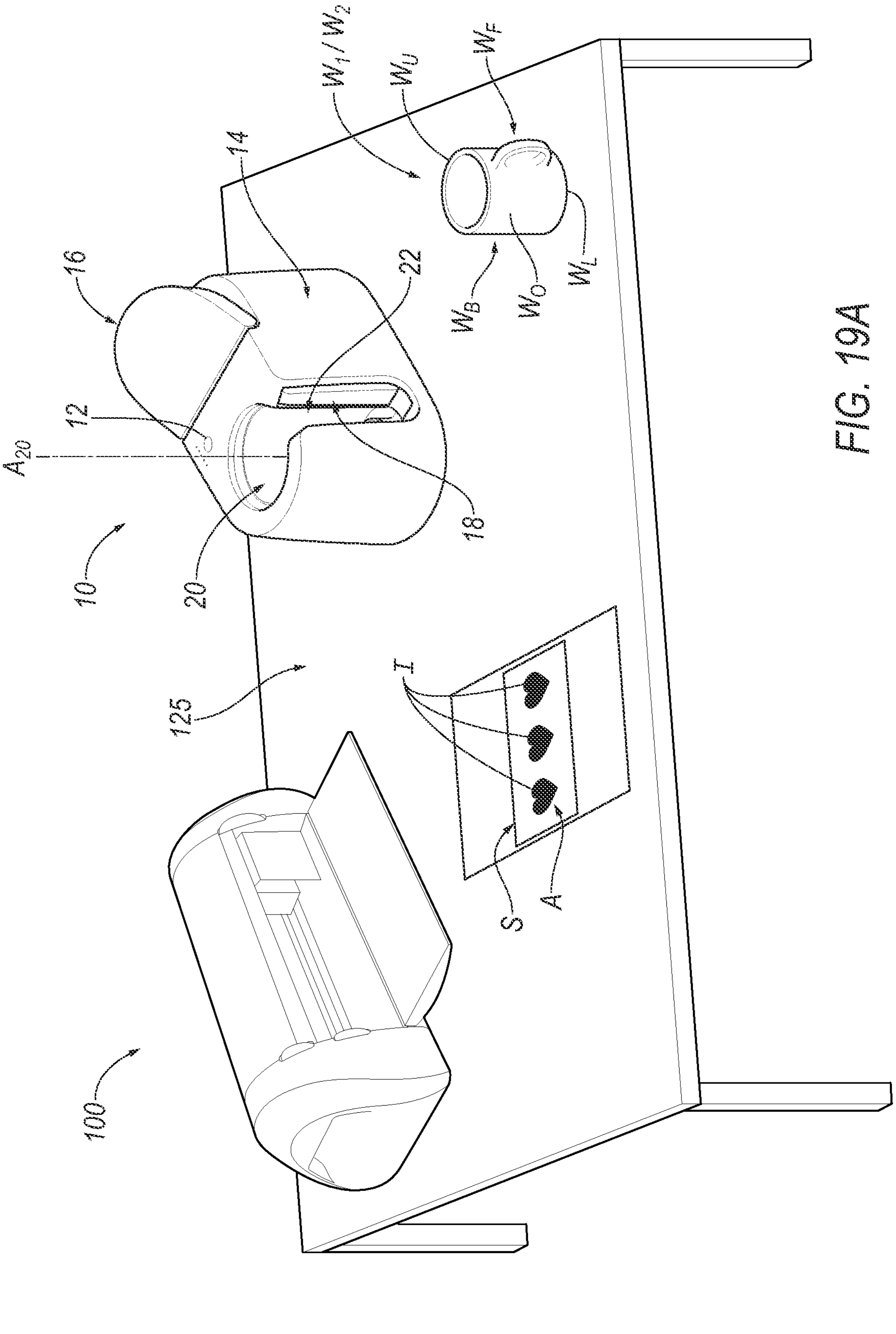
FIGS. 19A-19H illustrate a method for utilizing the sublimation device of FIG. 1, according to the principles of the present disclosure.
Figure 20A:
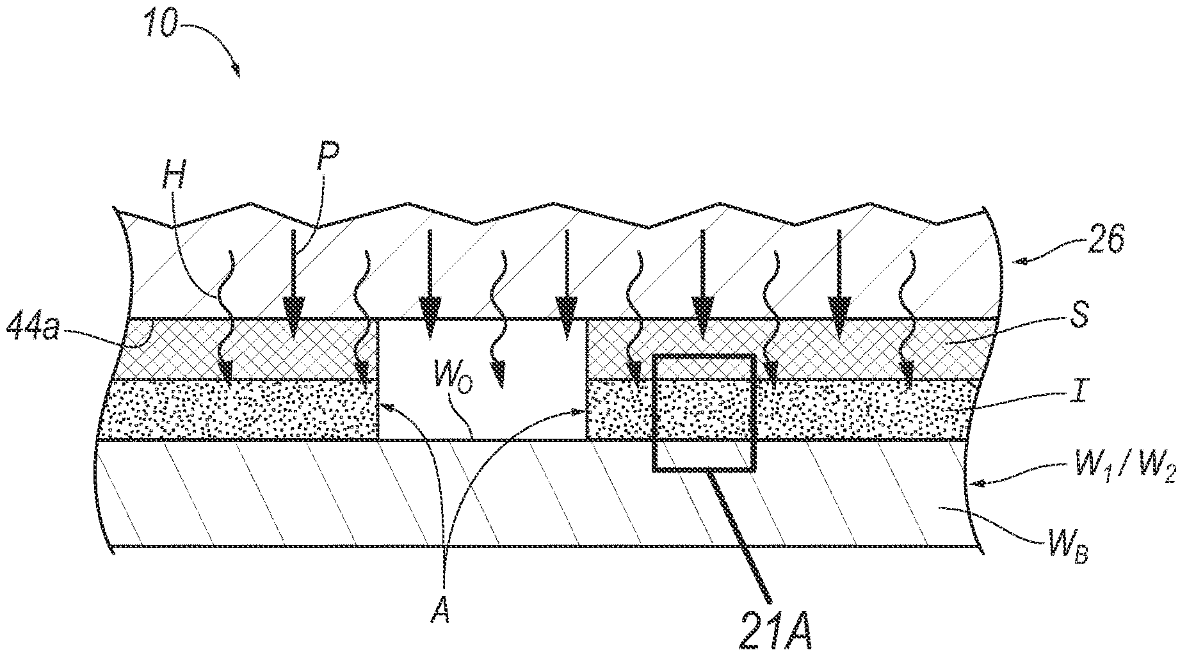
FIG. 20A is an enlarged cross-sectional view according to line 20-20 of FIG. 19E illustrating a portion of a workpiece that is inserted into, and subjected to heat and pressure from, the sublimation device, according to the present disclosure.
Figure 20B:
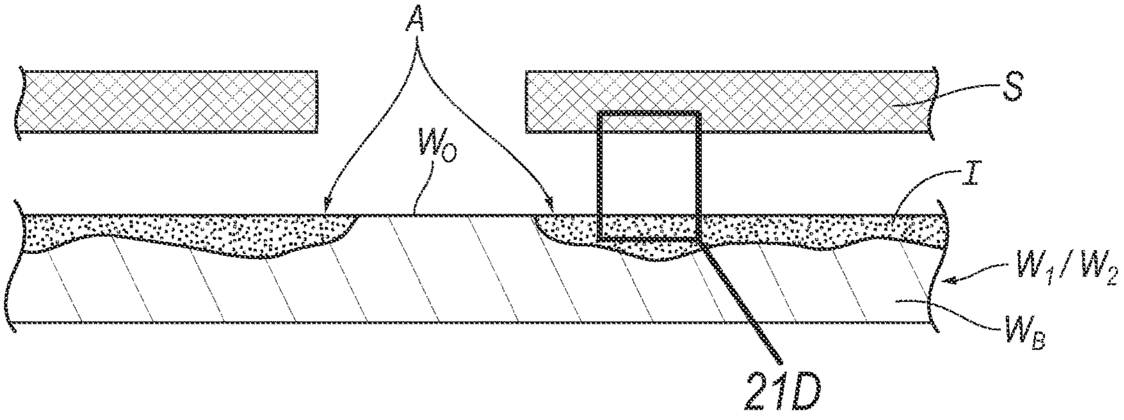
FIG. 20B is an enlarged cross-sectional view of the workpiece of FIG. 20A that includes sublimated ink from a transfer sheet, according to the present disclosure.

As seen at FIGS. 4-5, the cavity 20 of the sublimation device 10 is sized for receiving the plurality of differently sized workpieces W that may include, for example, the first workpiece $W_1$ that may be, for example, a 12 oz beverage container and the second workpiece $W_2$ that may be, for example, a 15 oz beverage container. Once one of the workpieces $W_1$, $W_2$ of the plurality of differently sized workpieces W has been placed within the cavity 20 and the workpiece-engaging device 18 has been arranged in the engaged orientation or "closed" position for circumferentially engaging the outer side surface $W_O$ of one of the workpieces $W_1$, $W_2$ of the plurality of differently sized workpieces W for circumferentially applying pressure P in a radially inward direction toward the central axis $A_{20}$-$A_{20}$ of the cavity 20, the sublimation device 10 may be activated for imparting heat H to the outer side surface $W_O$ of one of the workpieces $W_1$, $W_2$ of the plurality of differently sized workpieces W for sublimating the infusible sublimation ink I that forms the design A onto the outer side surface $W_O$ of one of the workpieces $W_1$, $W_2$ of the plurality of differently sized workpieces W. The infusible sublimation ink I that forms the design A may include any number of pictures, artwork, text, or the like, which may be created by a user. In some examples, as seen at FIG. 19A, the user may interface the transfer sheet S within a crafting machine 100 such that the crafting machine 100 may print and/or cut the design A on and/or into the transfer sheet S.

Figure 19B:
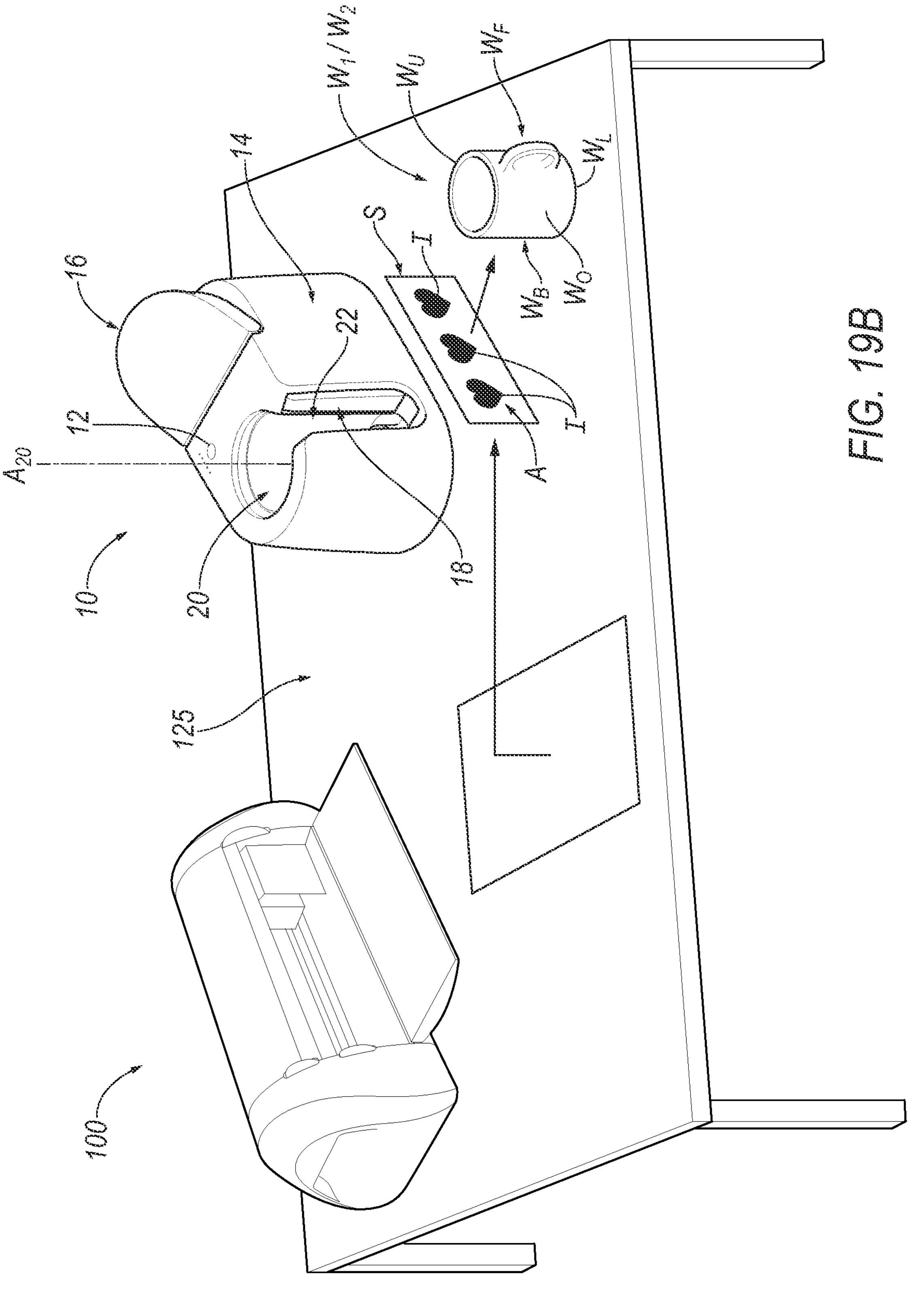
Figure 19C:
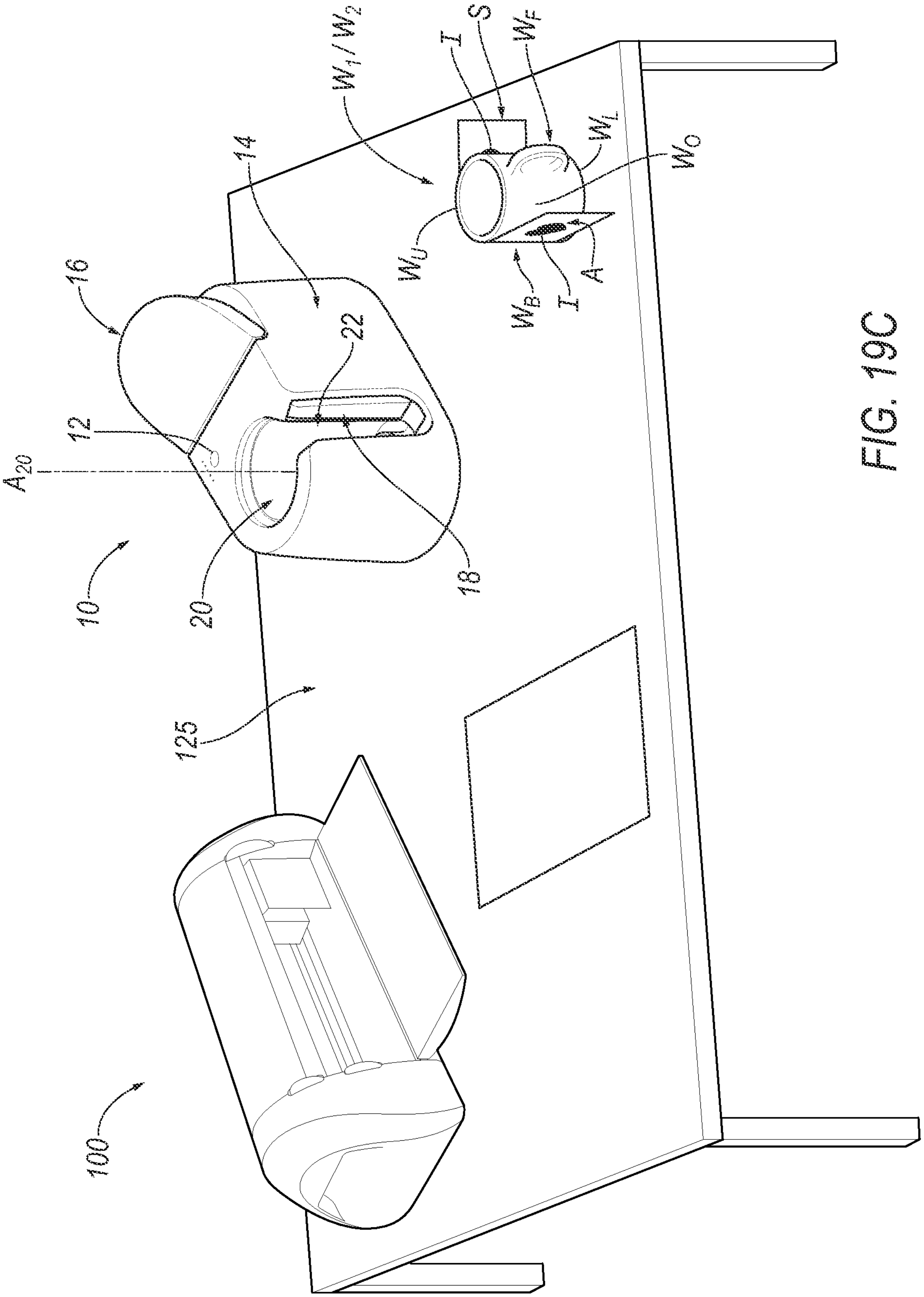
Figure 19D:
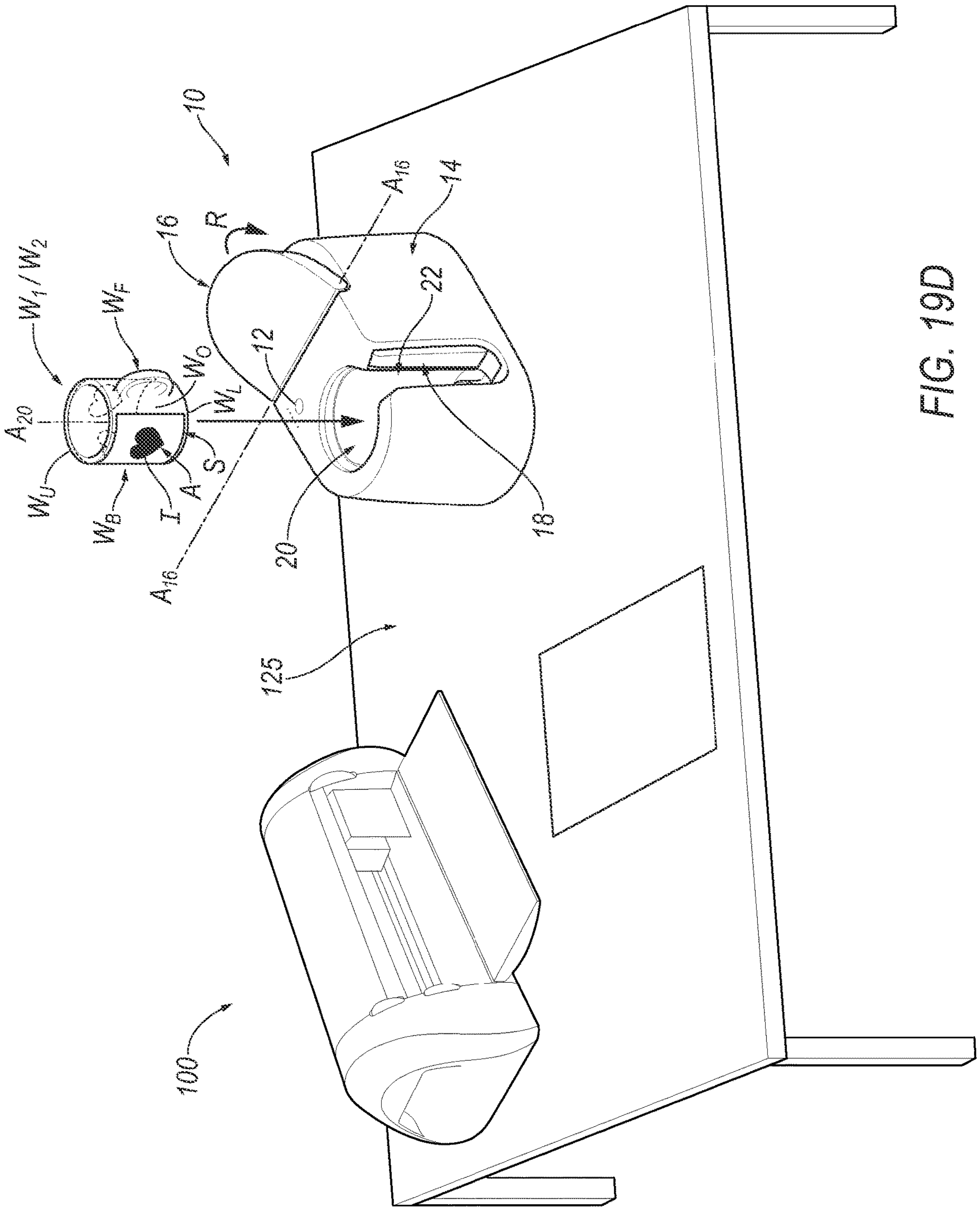
Figure 19E:
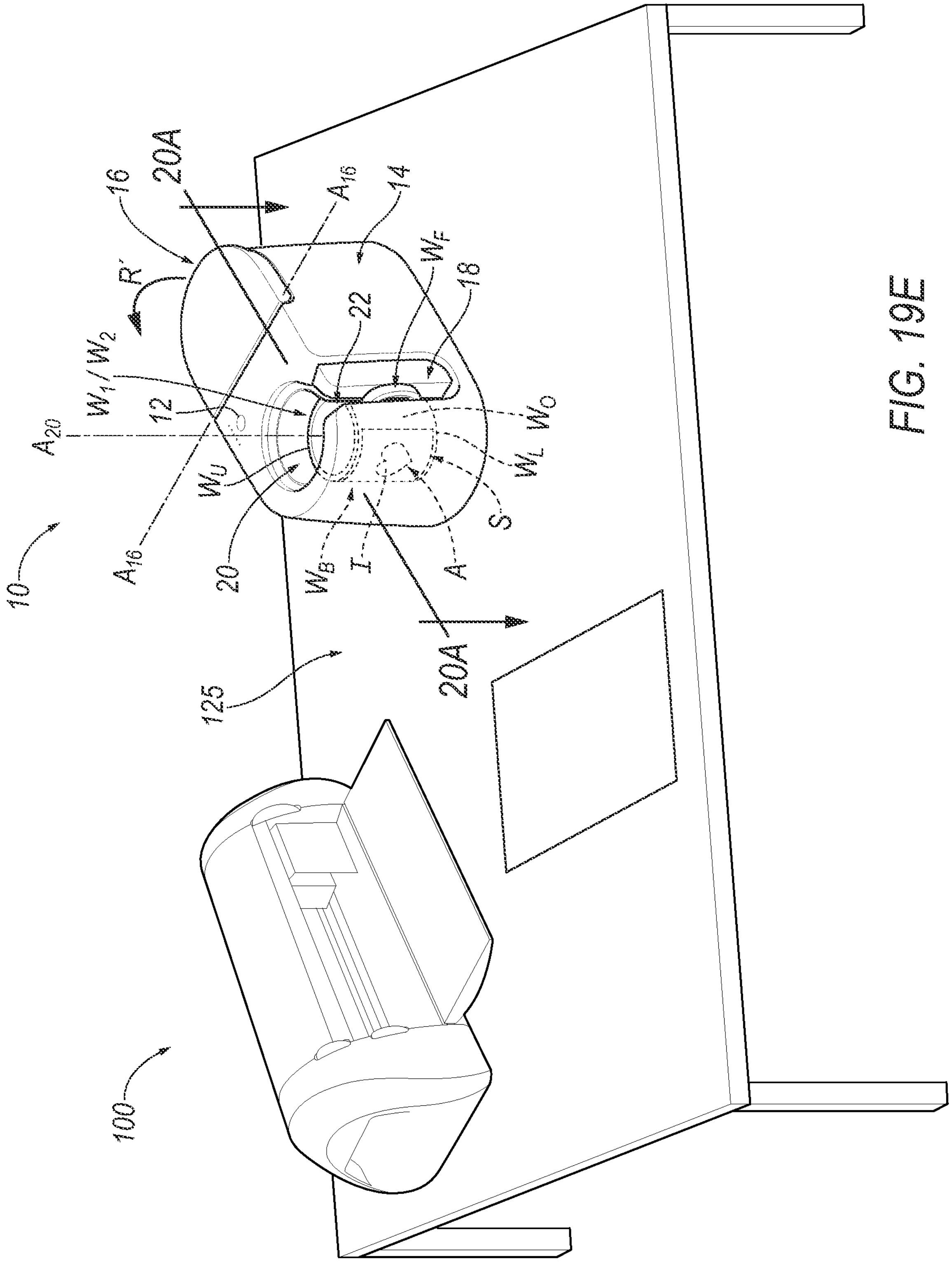

The sublimation of the infusible sublimation ink I that forms the design A onto the outer side surface $W_O$ of one of the workpieces $W_1$, $W_2$ of the plurality of differently sized workpieces W may include the transfer of the infusible sublimation ink I from the transfer sheet S onto or into the outer side surface $W_O$ of one of the workpieces $W_1$, $W_2$ of the plurality of differently sized workpieces W. With reference to FIGS. 19B-19D, before arranging the workpiece-engaging device 18 in a closed orientation around the outer side surface $W_O$ of one of the workpieces $W_1$, $W_2$ of the plurality of differently sized workpieces W (as seen at FIG. 19E), the user may place the transfer sheet S containing the infusible sublimation ink I adjacent the outer side surface $W_O$ of one of the workpieces $W_1$, $W_2$ of the plurality of differently sized workpieces W. Accordingly, when one of the workpieces $W_1$, $W_2$ of the plurality of differently sized workpieces W including the transfer sheet S is arranged within the cavity 20, the transfer sheet S is circumferentially arranged between an inner cylindrical wall (see, e.g., reference numeral 18' at FIGS. 2 and 6) of the workpiece-engaging device 18 and the outer side surface $W_O$ of one of the workpieces $W_1$, $W_2$ of the plurality of differently sized workpieces W. In this way, when the inner cylindrical wall 18' of the workpiece-engaging device 18 circumferentially applies a pressure P in a radially inwardly direction toward the outer side surface $W_O$ of one of the workpieces $W_1$, $W_2$ of the plurality of differently sized workpieces W, the transfer sheet S is pressed against the outer side surface $W_O$ of one of the workpieces $W_1$, $W_2$ of the plurality of differently sized workpieces W. Thus situated, heat H can then be substantially circumferentially applied: (1) from the inner cylindrical wall 18' 30) of the workpiece-engaging device

18; (2) through a thickness of the transfer sheet S containing sublimation ink pressed against the outer side surface $W_O$ of one of the workpieces $W_1$, $W_2$ of the plurality of differently sized workpieces W; and (3) onto or into the outer side surface $W_O$ of one of the workpieces $W_1$, $W_2$ of the plurality of differently sized workpieces W.

In some implementations, a predetermined amount and/or a predetermined duration of pressure P and heat H applied to the outer side surface $W_O$ of one of the workpieces $W_1$, $W_2$ of the plurality of differently sized workpieces W during the sublimation process achieves sufficient transfer of the infusible sublimation ink I from transfer sheet S to the outer side surface $W_O$ of one of the workpieces $W_1$, $W_2$ of the plurality of differently sized workpieces W. Variations in one or more of temperature associated with the H, the pressure P, or time between different portions of the outer side surface $W_O$ of one of the workpieces $W_1$, $W_2$ of the plurality of differently sized workpieces W may result in inconsistent transfers of infusible sublimation ink I, thereby causing faded, dimmed, or otherwise insufficient transfer of the infusible sublimation ink I to certain portions of the outer side surface $W_O$ of one of the workpieces $W_1$, $W_2$ of the plurality of differently sized workpieces W. Faded and dimmed portions of the infusible sublimation ink I to certain portions of the outer side surface $W_O$ of one of the workpieces $W_1$, $W_2$ of the plurality of differently sized workpieces W may appear, for example, where lower or insufficient temperatures associated with the applied heat H occurs on the outer side surface $W_O$ of one of the workpieces $W_1$, $W_2$ of the plurality of differently sized workpieces W. Accordingly, the sublimation device 10 is configured to provide consistent transfer of the heat H with sufficient pressure P around the entire outer side surface $W_O$ of the workpieces $W_1$, $W_2$ of the plurality of differently sized workpieces W where the infusible sublimation ink I is to be sublimated thereon.

In some instances, the inner cylindrical wall 18' of the workpiece-engaging device 18 or one or more other components of the sublimation device 10 proximate the inner cylindrical wall 18' of the workpiece-engaging device 18 is configured to maintain a temperature of approximately above about 180° C. in order to sublimate the infusible sublimation ink I on the transfer sheet S to the outer side surface $W_O$ of one of the workpieces $W_1$, $W_2$ of the plurality of differently sized workpieces W. In other configurations, the inner cylindrical wall 18' of the workpiece-engaging device 18 or one or more other components of the sublimation device 10 proximate the inner cylindrical wall 18' of the workpiece-engaging device 18 is configured to maintain a temperature of approximately above about 190° C.±5° C. in order to sublimate the infusible sublimation ink I on the transfer sheet S to the outer side surface $W_O$ of one of the workpieces $W_1$, $W_2$ of the plurality of differently sized workpieces W. In some implementations, the inner cylindrical wall 18' of the workpiece-engaging device 18 or one or more other components of the sublimation device 10 proximate the inner cylindrical wall 18' of the workpiece-engaging device 18 is configured to maintain a temperature of approximately about 193°C for approximately about 40 seconds.

As will be described in the following disclosure, a base heater 28 (see, e.g., FIG. 6) may be configured to maintain a temperature of approximately 210° C. (+/−10%) in order to mitigate a reduction of the temperature of the outer side surface $W_O$ of one of the workpieces $W_1$, $W_2$ of the plurality of differently sized workpieces W proximate a lower end surface $W_L$ (see, e.g., FIG. 1) of one of the workpieces $W_1$, $W_2$ that is opposite an upper end surface $W_U$ (see, e.g., FIG. 1) of the one of the workpieces $W_1$, $W_2$. Accordingly, by heating the lower end surface $W_L$ of one of the workpieces $W_1$, $W_2$ of the plurality of differently sized workpieces W, the sublimation device assists in eliminating a heat sink that would otherwise result in a temperature drop near an edge (e.g., where the outer side surface $W_O$ meets the lower end surface $W_L$) of one of the workpieces $W_1$, $W_2$.

In some instances, the sublimation device 10 may impart heat H to the outer side surface $W_O$ of one of the workpieces $W_1$, $W_2$ of the plurality of differently sized workpieces W for about 4-to-5 minutes. Furthermore, as will described in the following disclosure at FIGS. 14 and 15, portions of a heater 26 that may be arranged proximate to, or form the inner cylindrical wall 18' of, the workpiece-engaging device 18 may include a plurality of heating zones that will heat different portions (e.g., a left side zone, a right side zone, and a center zone) of the inner cylindrical wall 18' of the workpiece-engaging device 18 to different temperatures. For example, both of a left side zone and a right side zone of the inner cylindrical wall 18' of the workpiece-engaging device 18 may be heated H to a higher temperature (e.g., by about 10-20° C., such as, for example, to a temperature of approximately about 200-210° C.) in comparison to a center zone of the of the inner cylindrical wall 18' of the workpiece-engaging device 18. Accordingly, by heating the left side zone and the right side zone of the of the inner cylindrical wall 18' of the workpiece-engaging device 18 to a higher temperature than the center zone of the of the inner cylindrical wall 18' of the workpiece-engaging device 18, a successful sublimation of the infusible sublimation ink I arranged near, for example, the flange portion $W_F$ of one of the workpieces $W_1$, $W_2$ of the plurality of differently sized workpieces W may occur (i.e., otherwise, the flange portion $W_F$ of one of the workpieces $W_1$, $W_2$ of the plurality of differently sized workpieces W may result in a heat sink, and, therefore, a loss of heat H, which may result in a faded and dimmed portion of the infusible sublimation ink I on the outer side surface $W_O$ of one of the workpieces $W_1$, $W_2$ of the plurality of differently sized workpieces W that is arranged near the flange portion $W_F$.

During sublimation, the transfer of heat H may be affected by either convective or conductive heat losses. Even if, hypothetically, heat H was transferred evenly from the inner cylindrical wall 18' of the workpiece-engaging device 18 to the outer side surface $W_O$ of one of the workpieces $W_1$, $W_2$, certain areas of the outer side surface $W_O$ of one of the workpieces $W_1$, $W_2$ may be cooler than others due to these heat losses, which may affect certain areas of the outer side surface $W_O$ of one of the workpieces $W_1$, $W_2$ more than others. For example, because the cavity 20 is open at a top end thereof, the upper end surface $W_F$ of one of the workpieces $W_1$, $W_2$ of the plurality of differently sized workpieces W may be exposed to airflow or ambient air, and, as a result, is cooled due to convective heat loss; this may also occur at or around the edges of gap 22 (that may be at least partially formed by the upper trim surface **14*r* that may trim the outer housing 14**) where the flange portion $W_F$ of one of the workpieces $W_1$, $W_2$ of the plurality of differently sized workpieces W is arranged.

Additionally, one of the workpieces $W_1$, $W_2$ may functionally act as a heat sink to conductively transfer the heat H away from the outer side surface $W_O$ of one of the workpieces $W_1$, $W_2$ of the plurality of differently sized workpieces W to different extents at different areas of the outer side surface $W_O$ of one of the workpieces $W_1$, $W_2$ of the plurality of differently sized workpieces W. For example, some workpieces $W_1$, $W_2$ are formed such that the thickness of the material of the workpieces $W_1$, $W_2$ may not be the same, and, as a result, varies. In some instances, the lower end surface $W_L$ of one of the workpieces $W_1$, $W_2$ may be thicker than a sidewall portion of the workpieces $W_1$, $W_2$ that forms the outer side surface $W_O$. In some examples, the thickness of the sidewall portion of the workpieces $W_1$, $W_2$ that forms the outer side surface $W_O$ may vary around or vertically up and down the cylindrical sidewalls of the workpieces $W_1$, $W_2$. Thicker portions of the workpieces $W_1$, $W_2$ may, for example, be found at the lower end surface $W_L$ of one of the workpieces $W_1$, $W_2$ where the outer side surface $W_O$ meets the lower end surface $W_L$. Thick portions of material forming the workpieces $W_1$, $W_2$ may be commonly found at or around the flange portion $W_F$ of one of the workpieces $W_1$, $W_2$ or where the flange portion $W_F$ of one of the workpieces $W_1$, $W_2$ meets the body portion WB of one of the workpieces $W_1$, $W_2$. Accordingly, lower surface temperatures, and, thus, less effective transfer of the infusible sublimation ink I from the transfer sheet S to the outer side surface $W_O$ of one of the workpieces $W_1$, $W_2$ are more likely to occur at areas on the outer side surface $W_O$ of one of the workpieces $W_1$, $W_2$ of the plurality of differently sized workpieces W that coincide with these thicker “heat-sink portions” or other areas of the workpieces $W_1$, $W_2$ that are susceptible to conductive and convective heat losses.

Exemplary sublimation devices 10 that are described in the present disclosure provide a heat source that enables consistent transfer of heat H to the outer side surface $W_O$ of one of the workpieces $W_1$, $W_2$ of the plurality of differently sized workpieces W such that the entirety of the body portion WB of one of the workpieces $W_1$, $W_2$ of the plurality of differently sized workpieces W is available for sublimation as a result of the outer side surface $W_O$ of one of the workpieces $W_1$, $W_2$ being heated to a sufficient temperature, and, with sufficient consistency, for successful transfer of the infusible sublimation ink I from the transfer sheet S to the outer side surface $W_O$ of one of the workpieces $W_1$, $W_2$ of the plurality of differently sized workpieces W without dimmed or faded areas of the design A on the outer side surface $W_O$ of one of the workpieces $W_1$, $W_2$ of the plurality of differently sized workpieces W. In some implementations, the entirety of the body portion WB that is available for sublimation may include the outer side surface $W_O$ of one of the workpieces $W_1$, $W_2$ extending from the upper end surface $W_F$ of one of the workpieces $W_1$, $W_2$ of the plurality of differently sized workpieces W to the lower end surface $W_L$ of one of the workpieces $W_1$, $W_2$ of the plurality of differently sized workpieces W. Furthermore, the entirety of the body portion WB of one of the workpieces $W_1$, $W_2$ of the plurality of differently sized workpieces W that is available for sublimation may also include some of the body portion WB of one of the workpieces $W_1$, $W_2$ of the plurality of differently sized workpieces W that extend from either side of the flange portion $W_F$ of one of the workpieces $W_1$, $W_2$ of the plurality of differently sized workpieces W.

Referring to FIG. 6, another view of an exemplary sublimation device 10 including the workpiece engagement actuator 16 and the workpiece-engaging device 18 that form the cavity 20 is shown. In some configurations, the workpiece-engaging device 18 includes a heating assembly 24 formed by one or more materials or one or more material layers that form the substantially cylindrical sidewall of the workpiece-engaging device 18 that may contribute to at least partially forming the cylindrical cavity 20.

In some configurations, the heating assembly 24 includes the heater 26 and/or the base heater 28. In some implementations, the heater 26 forms a pad and may include, for example, one or more layers of material (see, e.g., layers 44*a*-44*c*, 46*a*-46*d*, and 48 at FIG. 12) disposed adjacent one another and then formed into the substantially cylindrical shape of the workpiece-engaging device 18 such that the one or more layers of material are disposed concentrically together. Furthermore, the base heater 28 may be disposed adjacent a lower end of the heater 26 for enclosing a bottom end of the substantially cylindrical shape of the heater 26, which may alternatively be referred to as a “heat pad”. As seen at FIG. 6, in some instances, an innermost layer of the one or more layers of the cylindrical portion of heating assembly 24 may include the heater 26; accordingly an innermost layer of the heater 26 may define the inner cylindrical wall 18' of the workpiece-engaging device 18 that is configured to contact the outer side surface $W_O$ of one of the workpieces $W_1$, $W_2$ of the plurality of differently sized workpieces W.

In some implementations, the top surface of base heater 28 may be arranged perpendicular to the central axis $A_{20}$-$A_{20}$ of the substantially cylindrical cavity 20. In this way, when one of the workpieces $W_1$, $W_2$ of the plurality of differently sized workpieces W is placed within the cavity 20, the top surface of base heater 28 contacts the lower end surface $W_L$ of one of the workpieces $W_1$, $W_2$ of the plurality of differently sized workpieces W to provide a transfer of heat H to one of the workpieces $W_1$, $W_2$ of the plurality of differently sized workpieces W from below in addition to a transfer of heat H to the outer side surface $W_O$ of one of the workpieces $W_1$, $W_2$ of the plurality of differently sized workpieces W from the heater 26. The base heater 28 provides heat H to the lower end surface $W_L$ of one of the workpieces $W_1$, $W_2$ of the plurality of differently sized workpieces W so that the lower end surface $W_L$ does not act as a heat sink that draws heat away from the lower end surface $W_L$ of one of the workpieces $W_1$, $W_2$ of the plurality of differently sized workpieces W where the lower end surface $W_L$ meets the outer side surface $W_O$ during sublimation. In other words, the base heater 28 heats the lower end surface $W_L$ of one of the workpieces $W_1$, $W_2$ of the plurality of differently sized workpieces W during sublimation to minimize a temperature difference or temperature gradient between the lower end surface $W_L$ and a portion edge of the outer side surface $W_O$ that is near or extends from the lower end surface $W_L$. As such, a transfer of heat H from the portion edge of the outer side surface $W_O$ that is near or extends from the lower end surface $W_L$ into the lower end surface $W_L$ of one of the workpieces $W_1$, $W_2$ of the plurality of differently sized workpieces W, which would otherwise reduce the temperature at the portion edge of the outer side surface $W_O$ that is near or extends from the lower end surface $W_L$ is minimized or eliminated.

In some instances, the base heater 28 may be configured to heat H the lower end surface $W_L$ of one of the workpieces $W_1$, $W_2$ of the plurality of differently sized workpieces W such that the lower end surface $W_L$ is hotter than the outer side surface $W_O$ of one of the workpieces $W_1$, $W_2$ of the plurality of differently sized workpieces W during sublimation, causing the portion edge of the outer side surface $W_O$ that is near or extends from the lower end surface $W_L$ to increase in temperature relative to the rest of the outer side surface $W_O$. This increased temperature at the portion edge of the outer side surface $W_O$ that is near or extends from the lower end surface $W_L$ may offset any potential convective heat losses introduced by ambient airflow into the cavity 20 that travels near the lower end surface $W_L$.

Accordingly, while the user may not be transferring the infusible sublimation ink I from the transfer sheet S to the lower end surface $W_L$ of one of the workpieces $W_1$, $W_2$ of the plurality of differently sized workpieces W, the heat H provided to the lower end surface $W_L$ enables the heater 26 to heat the portion edge of the outer side surface $W_O$ that is near or extends from the lower end surface $W_L$ without the lower end surface $W_L$ reducing the surface temperature of the portion edge of the outer side surface $W_O$ that is near or extends from the lower end surface $W_L$ due to conductive heat losses and/or convective heat losses. Thus, temperatures at or near the portion edge of the outer side surface $W_O$ that is near or extends from the lower end surface $W_L$ may be maintained consistent with the rest of the outer side surface $W_O$ of one of the workpieces $W_1$, $W_2$ of the plurality of differently sized workpieces W so that the infusible sublimation ink I transferred thereto is not faded or dimmed at one or more regions at or near the portion edge of the outer side surface $W_O$ that is near or extends from the lower end surface $W_L$ during the sublimation process.

With reference to FIG. 7, a view of an exemplary sublimation device 10 is shown without the outer housing 14 in order to illustrate an exemplary configuration of internal components thereof such as, for example, intervening connecting structure 17 that connects the workpiece engagement actuator 16 to the workpiece-engaging device 18. In some implementations, as seen at, for example, FIG. 7, the heating assembly 24 may be surrounded by one or more of the workpiece-engaging device 18 and/or other support structures. In another example as shown at FIG. 7, the heating assembly 24 may be at least partially supported by a surrounding clamp 30) framework 25 that may include, for example, various support brackets, a spring sheet or other outer support members around a periphery of heating assembly 24, such as, for example, clamp jaws, an upper curved support bracket. The surrounding clamp framework 25 may further include other support structure and clamping mechanisms associated with the intervening connecting structure 17 that extends between and connects the workpiece engagement actuator 16 to one or both of the workpiece-engaging device 18 and the heating assembly 24.

Figure 8:
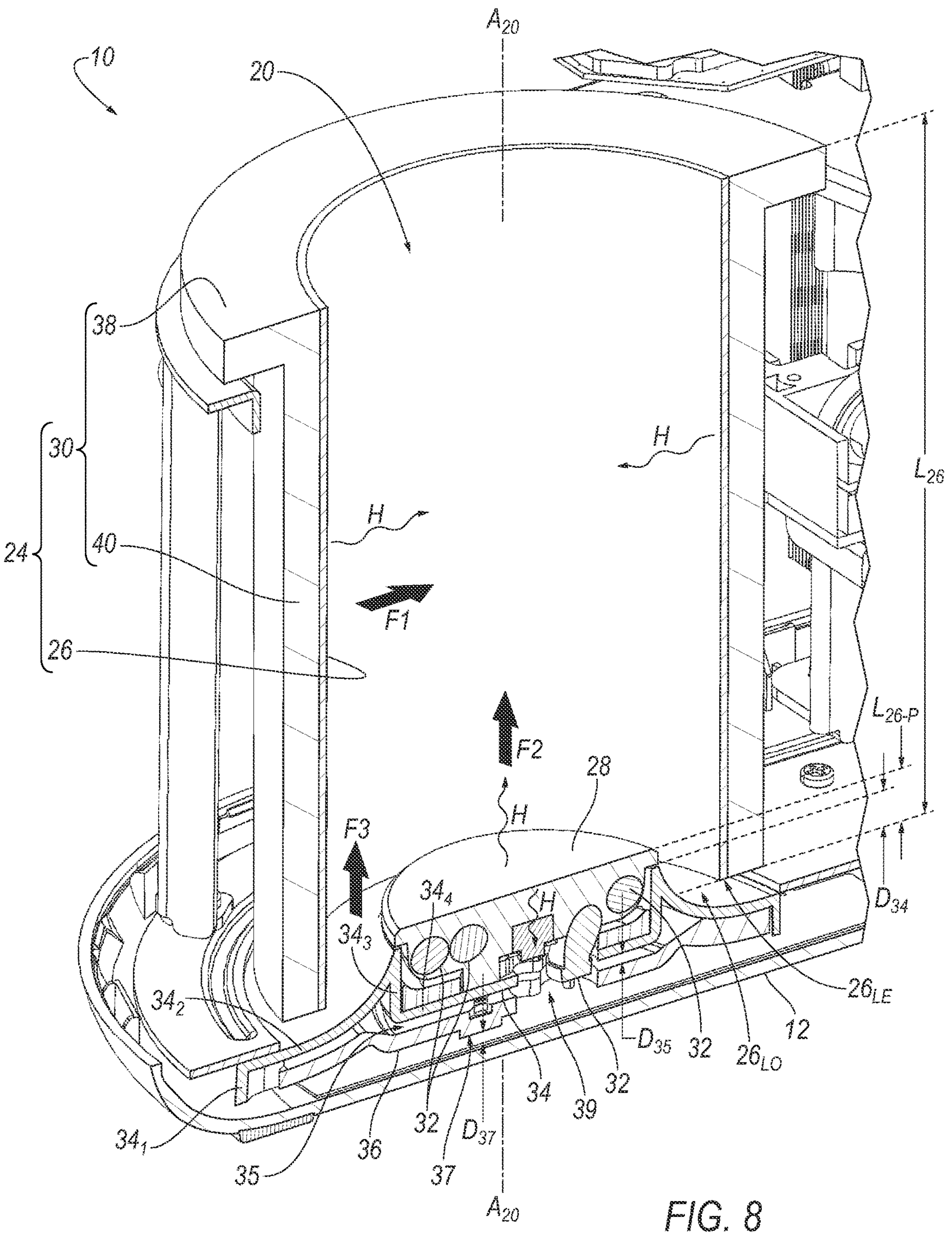
FIG. 8 is an enlarged cross-sectional view of the sublimation device according to line 8-8 of FIG. 7.

Referring to FIG. 8, a cross-sectional view of an exemplary configuration of internal components of the sublimation device 10 of FIG. 7 is shown. As seen at FIG. 8, some configurations of the heating assembly 24 may include a cylindrical wall portion having multiple layers, such as, for example, the heater 26 and an insulative insert 30. Also shown at FIG. 8 is an exemplary configuration of a base heater 28 that may include a ceramic material or other material with one or more internal heating coils 32 disposed therein. In some instances, the base heater 28 may be secured within the outer housing 14 of the sublimation device 10 via a pedestal 34 situated below and/or around the base heater 28. In addition, in some implementations, a lower insulative barrier 36 may be disposed between the pedestal 34 and the outer housing 14; in this way, the heat H that is generated by the base heater 28 during use is at least partially prevented from transferring to the outer housing 14 and into a support surface (such as, e.g., a table 125 as seen at FIGS. 19A-19H) on which the sublimation device 10 is placed.

In some configurations, the lower insulative barrier 36 and the pedestal 34 may be separated by a distance $D_{35}$ to allow an air gap 35 to form therebetween. This air gap 35 improves the insulation between the pedestal 34 and the lower insulative barrier 36, and, furthermore, between the base heater 28 and the outer housing 14 or any surface (e.g., the table 125) on which the sublimation device 10 rests. In some configurations, at least a portion of the insulative barrier 36 may also be separated from outer housing 14 at a distance $D_{35}$ to form another air gap 37 for further enhancing insulation properties between the base heater 28 and the outer housing 14.

With continued reference to FIG. 8, the pedestal 34 may include an outer axially-extending portion 341, a frustoconical portion 34$_2$, an inner axially-extending portion 343, and a substantially radially-extending portion 344. The axially-extending portion 341 may surround or circumscribe the insulative barrier 36. A radially outward-most portion of the frustoconical portion 34$_2$ extends from an upper end of the axially-extending portion 341 and is arranged over or above the insulative barrier for forming the air gap 35.

As the frustoconical portion 34$_2$ extends in a substantially radial direction toward the central axis $A_{20}$-$A_{20}$ of the cavity 20 from the upper end of the axially-extending portion 341, some of the frustoconical portion 34$_2$ may be arranged axially below or under a lower opening 26$_{LO}$ formed by a lower end 26$_{LE}$ of the heater 26. However, as the frustoconical portion 34$_2$ further extends in the substantially radial direction toward the central axis $A_{20}$-$A_{20}$ of the cavity 20, the frustoconical portion 34$_2$ also extends in a substantially axial direction away from the insulative barrier 36 such that some of the frustoconical portion 34$_2$ of the pedestal 34 extends axially through the lower opening 26$_{LO}$ of the heater 26 and into the cavity 20 at a distance $D_{34}$. Accordingly, some of the pedestal 34 (e.g., the outer axially-extending portion 341 and some of the frustoconical portion 34$_2$) is not arranged within the cavity 20 while another portion of the pedestal 34 (e.g., the portion of the frustoconical portion 34$_2$ that extends axially through the lower opening 26$_{LO}$ of the heater 26 and into the cavity 20 at the distance $D_{34}$) is arranged within the cavity 20.

With further reference to FIG. 8, a first end of the inner axially-extending portion 343, extends from a radially inwardly-most portion of the frustoconical portion 34$_2$ in an axial direction toward the insulative barrier 36. Accordingly, in some configurations, some of the inner axially-extending portion 343 may be arranged within the cavity 20 and some of the inner axially-extending portion 343 may not be arranged within the cavity 20.

As also seen at FIG. 8, a first end of the substantially radially-extending portion 344 extends from a second end of the inner axially-extending portion 343 toward the central axis $A_{20}$-$A_{20}$ of the cavity 20. The inner axially-extending portion 343 and the substantially radially-extending portion 344 may form a nest that contains the base heater 28. The substantially radially-extending portion 344 may form a passage 39 of the pedestal 34; accordingly one or more components associates with the base heater 28 such as, for example, one or more internal heating coils 32 may pass through or extend through the passage 39.

Because the frustoconical portion 34$_2$ of the pedestal 34 extends axially through the lower opening 26$_{LO}$ of the heater 26 and into the cavity 20 at the distance $D_{34}$, the pedestal 34 is configured to correspondingly axially raise, axially elevate, or axially position the base heater 28 within the cavity 20. For example, as seen at FIG. 8, an axial length portion $L_{26-P}$ of an axial length $L_{26}$ of the pedestal 34 surrounds the base heater 28 as a result of the pedestal 34 arranging the base heater 28 at least at an axial distance (see, e.g., the distance $D_{34}$) away from the lower end 26$_{LE}$ of the heater 26.

As a result of the arrangement of the heater 26, which may be alternatively referred to as a first heater, and the base heater 28, which may be alternatively referred to as a second heater, at least two unique flows (see, e.g., arrows F1, F2) of heat H within the cavity 20 may be achieved. For example, as seen at FIG. 8, upon activating the heater 26, heat H may transmit therefrom in a first direction, which may be a radially inwardly direction toward the central axis $A_{20}$-$A_{20}$ of the cavity 20, resulting in a first heat flow F1 during a first time period. Furthermore, as also seen at FIG. 8, upon activating the base heater 28, heat H may transmit therefrom in a second direction, which may be an axial direction away from the lower end $26_{LE}$ of the heater 26, resulting in a second heat flow F2 during at least a portion of the first time period.

In some instances, the first direction associated with the first heat flow F1 is orthogonal the second direction associated with the second heat flow F2. In some examples, upon activating the heater 26, heat H may transmit therefrom in the second direction, toward the base heater 28 and an upper end (opposite the lower end $26_{LE}$) of the heater 26, resulting in a third heat flow F3 during at least a portion of the first time period. In particular, a first portion of the third heat flow F3 may be disposed on a first (e.g., lower) axial side of the base heater 28, and a second portion of the third heat flow F3 may be disposed on a second (e.g., upper) axial side of the base heater 28. Accordingly, at least a portion of the heat flow F2 and/or the heat flow F3 may be transferred to the lower end surface $W_L$ of one of the workpieces $W_1$, $W_2$ during use of the sublimation device 10, due in part to the pedestal 34. The heat H associated with the first, second, and/or third heat flows F1, F2, F3 may be insulated by, for example, one or more of the air gaps 35, 37 and/or material that forms one or both of the pedestal 34 and the insulative barrier 36.

Figure 9:
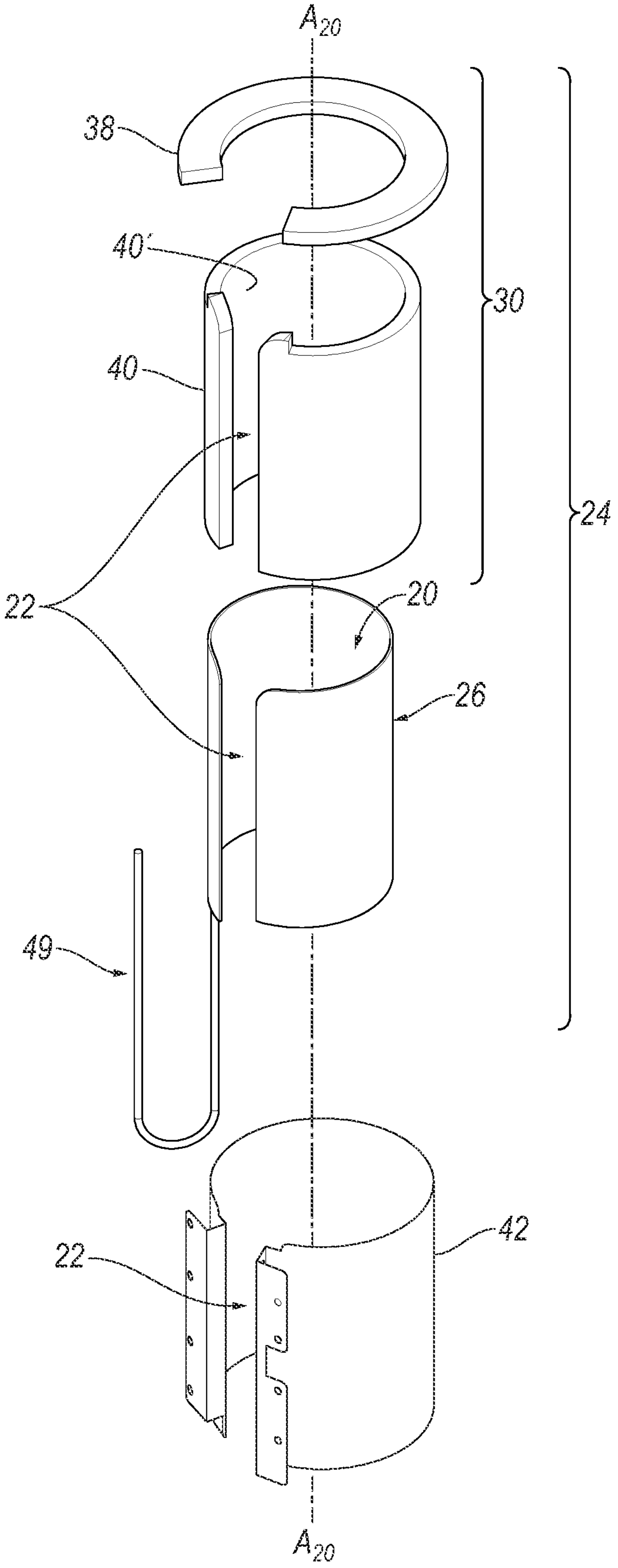
FIG. 9 is an exploded view of a portion of the workpiece-engaging device of the sublimation device of FIG. 1, according to the present disclosure.
Figure 10:
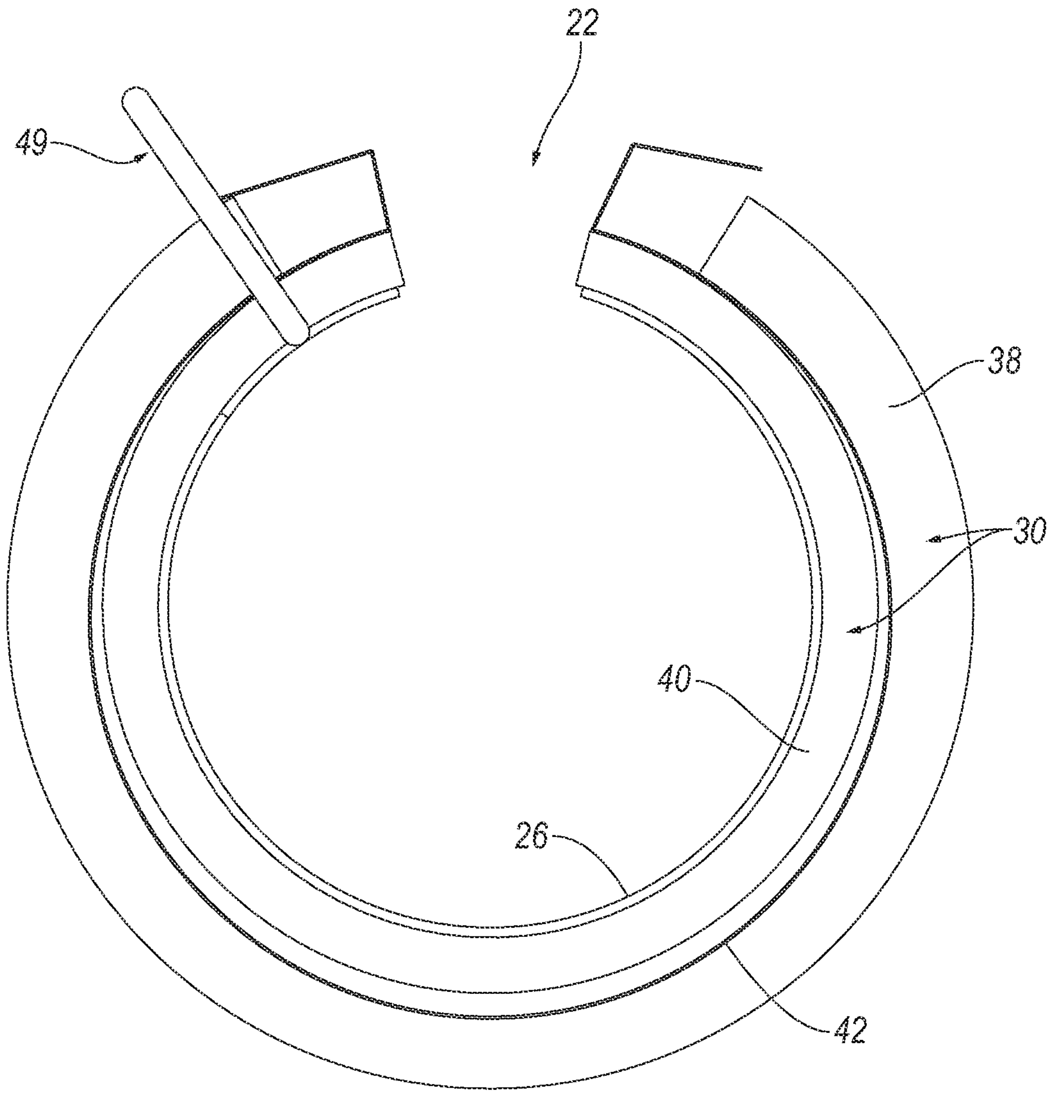
FIG. 10 is a top assembled view of the portion of the workpiece-engaging device of the sublimation device of FIG. 9, according to the present disclosure.
Figure 11:
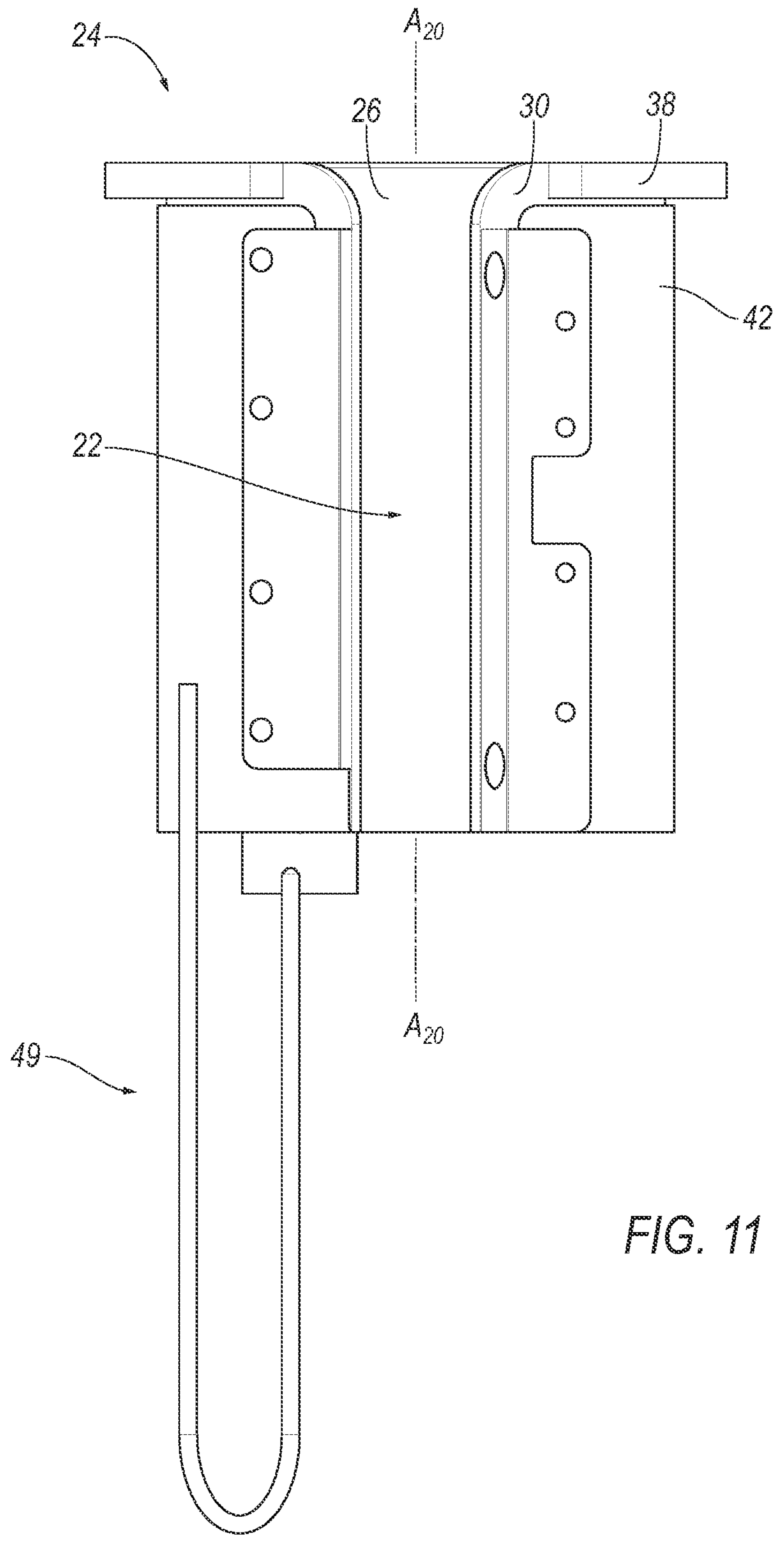
FIG. 11 is a side assembled view of the portion of the workpiece-engaging device of FIG. 9.

Referring to FIG. 9, an exploded view of the heating assembly 24 and an exemplary configuration of some of the support structure. In assembled form, another exemplary configuration of the support structure is also seen at FIG. 8, which may include, for example, the insulative insert 30. In some configurations, as seen at FIG. 9, the exemplary insulative insert 30 may include an upper lip portion 38 that is separate from and joined to a sidewall portion 40; although the upper lip portion 38 is shown separated from the sidewall portion 40 at FIG. 9, the upper lip portion 38 may be integrally formed with the sidewall portion 40 as one piece as seen, for example, at FIG. 8. In other implementations, as seen at FIG. 9, the heater 26 may be configured to be disposed radially inwardly of (relative to the central axis $A_{20}$-$A_{20}$ of the cavity and concentrically with respect to the insulative insert 30. In some configurations, a spring sheet 42 (see also FIG. 7) may be configured to be disposed radially outwardly of (relative to the central axis $A_{20}$-$A_{20}$ of the cavity and concentrically with respect to the insulative insert 30 and the heater 26. The spring sheet 42 may provide structural rigidity and support to the heating assembly 24 as well as a connection point for the clamping mechanism associated with the intervening connecting structure 17 that extends between and connects the workpiece engagement actuator 16 to one or both of the workpiece-engaging device 18 and the heating assembly 24 such that when spring sheet 42 is urged by the intervening connecting structure 17 to one of a "closed" orientation (for arranging the workpiece-engaging device 18 in a closed orientation around the outer side surface $W_O$ of one of the workpieces $W_1$, $W_2$ of the plurality of differently sized workpieces W) and an "opened" orientation (for arranging the workpiece-engaging device 18 in an opened orientation away from the outer side surface $W_O$ of one of the workpieces $W_1$, $W_2$ of the plurality of differently sized workpieces W), the heating assembly 24 is also corresponding arranged in a "closed" orientation and an "opened" orientation, respectively. With reference to FIG. 10, a lower end view of the heating assembly 24 and the spring sheet 42 (that are arranged in an assembled configuration), shows the concentric disposition of the various components thereof. FIG. 11 shows a side elevation view thereof with the heating assembly 24 assembled to and concentrically disposed within the spring sheet 42 (relative to the central axis $A_{20}$-$A_{20}$ of the cavity 20), with the upper lip 38 extending radially outwardly over a top edge of the spring sheet 42.

Figure 12:
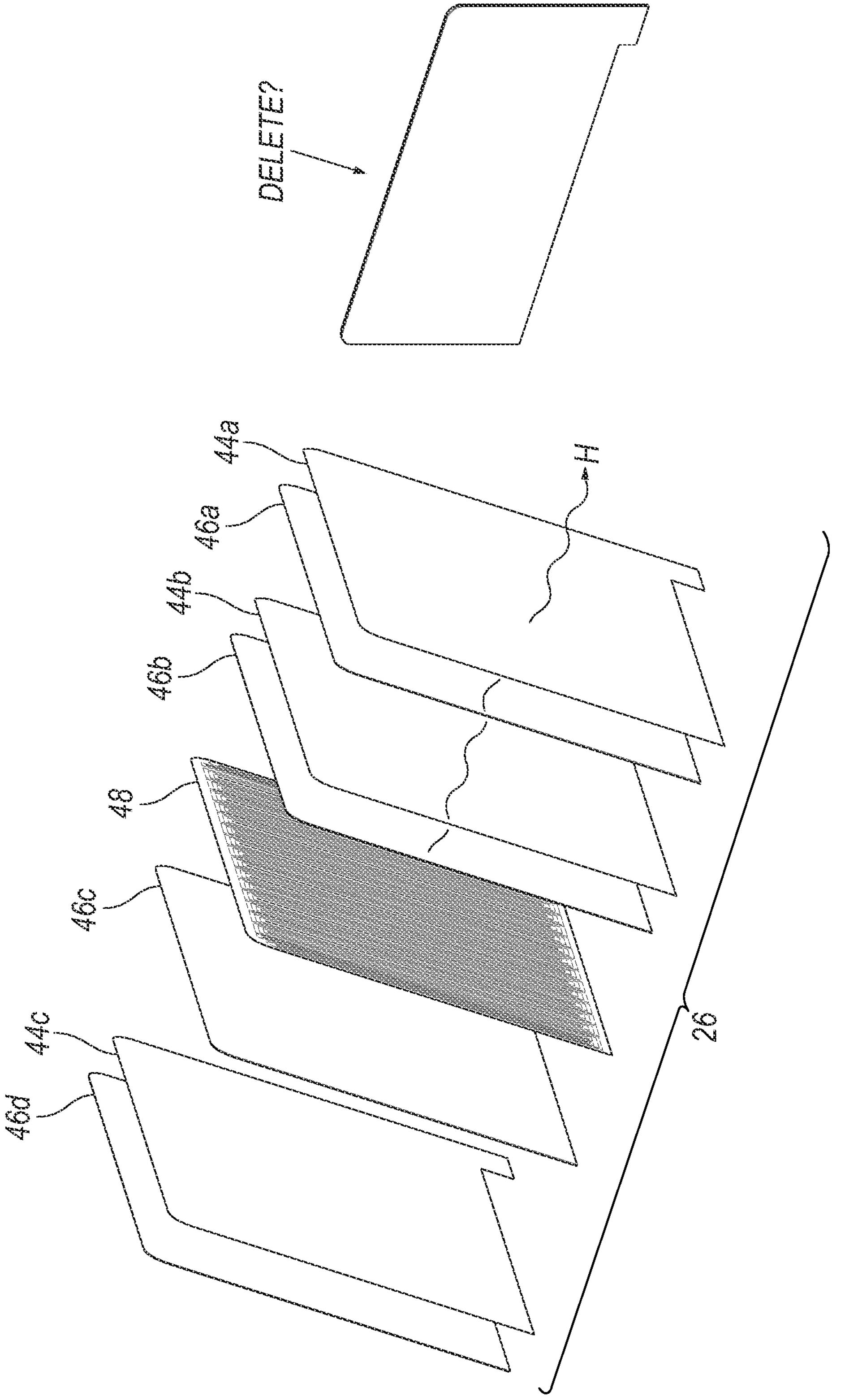
FIG. 12 is an exploded view of an exemplary heater of the sublimation device of FIG. 1, according to the present disclosure.

Referring to FIG. 12, an exploded view of an exemplary heater 26, is shown. The exemplary heater 26 may include a plurality of layers. In some configurations, the heater 26 may include eight layers, with an innermost layer (that is seen at reference numeral 44*a*) configured for engagement with the outer side surface $W_O$ of one of the workpieces $W_1$, $W_2$ of the plurality of differently sized workpieces W and an outermost layer (that is seen at reference numeral 46*d*) configured for engagement with an inner surface 40' (see, e.g., FIG. 9) of the sidewall portion 40 of the insulative insert 30. In some configurations, the innermost layer 44*a* may include a glass fiber material. In other configurations, the innermost layer 44*a* may include a fiberglass and/or TEFLON® coated mesh.

With reference to FIG. 12, one or more additional layers of the plurality of layers may include a material that is similar to that of the innermost layer 44*a*; such exemplary layers share the same reference numeral and are seen at reference numerals 44*b* and 44*c*. The material layers 44*a*, 44*b*, 44*c* may be referred to as a plurality of "first material type" layers that include a similar material composition. Accordingly, in some configurations, the plurality of first material type layers 44*a*-44*c* may include glass fiber layers.

With continued reference to FIG. 12, one or more additional layers of the plurality of layers may include a different type of material when compared to the plurality of first material type layers 44*a*-44*c*; such exemplary layers share the same reference numeral and are seen at reference numerals 46*a*, 46*b*, 46*c*, and 46*d*. The material layers 46*a*, 46*b*, 46*c*, and 46*d* may be referred to as a plurality of "second material type" layers that include a similar material composition. Accordingly, in some configurations, the plurality of second material type layers 46*a*-46*d* may include silicon layers. As seen at FIG. 12, the plurality of first material type layers 44*a*-44*c* and the plurality second material type layers 46*a*-46*d* are arranged in a configuration such that layers of each of the plurality of first material type layers 44*a*-44*c* and the plurality second material type layers 46*a*-46*d* are not arranged adjacent one another. In some instances, the plurality second material type layers 46*a*-46*d* may include silicone and are hot melted or hot pressed into adjacently arranged layers formed by the plurality of first material type layers 44*a*-44*c* that may include glass fiber in order to fuse the adjacently layers 44*a*-44*c*, 46*a*-46*d* together.

With reference to FIG. 12, in some configurations, the heater 26 may further include a heat-generating element 48. The heat generating element 48 may be connected to an electrical lead or electrical terminal (see, e.g., reference numeral 49 at FIGS. 9-11) such that when the heater 26 is powered-on (e.g., upon a user depressing the button 12 of the sublimation device 10), the heat-generating element 48 is electrically activated, and, therefore, generates the heat H in direction toward the innermost layer 44*a*. In order for the heat generating element 48 to be electrically activated, the sublimation device 10 may be electrically connected to a battery, or, alternatively, a power outlet by, for example a power cord (not shown) extending from the sublimation device 10. As seen at FIG. 12, the heat-generating element 48 may be disposed between two of the layers of the plurality second material type layers 46*a*-46*d*, such as, for example, a silicone layer 46*b* and another silicon layer 46*c*. Although one heat-generating element 48 is shown at FIG. 12, the heater 26 may include more than one heat-generating elements 48; for example, the illustrated heat-generating element 48 or another heat-generating element may be placed between, for example, a silicone layer 46*a* and the silicon layer 46*b*, and/or, the silicon layer 46*c* and a silicon layer 46*d*. Furthermore, in some configurations, the heater 26 may include more or less: silicone layers 46*a*, 46*b*, 46*c*, and 46*d*; and glass fiber layers 44*a*, 44*b*, and 44*c* than those shown. In other configurations, one or more layers of other materials or combinations thereof may also be disposed adjacent to or between any of the plurality of first material type layers 44*a*-44*c*, the plurality of second material type layers 46*a*-46*d*, and the heat—generating element 48.

The thicknesses of each layer of the plurality of first material type layers 44*a*-44*c*, the plurality of second material type layers 46*a*-46*d*, and the heat-generating element 48 of the heater 26 shown in FIG. 12 may be the same, or, alternatively, vary between one or more other implementations. In some implementations, the thicknesses of one or more layers of the plurality of second material type layers 46*a*-46*d* are different than the thicknesses of one or more layers of the plurality of first material type layers 44*a*-44*c*. Accordingly, the thicknesses of any of the layers 44*a*-44*c*, 46*a*-46*d*, and the heat-generating element 48 forming the heater 26 may be deliberately differentiated in order to provide a desired transfer of the heat H from the heat-generating element 48 in a direction toward and subsequently through the innermost layer 44*a* that is configured for engagement with the outer side surface $W_O$ of one of the workpieces $W_1$, $W_2$ of the plurality of differently sized workpieces W.

In some implementations, a total thickness of the heater 26 may be between approximately about 1.5 mm and 1.9 mm. An exemplary thickness of each layer of the plurality of first material type layers 44*a*-44*c*, which may include a fiberglass material may be approximately about 0.1 mm. An exemplary thickness of each layer of the plurality of second material type layers 46*a*-46*d*, which may include a silicone material may be approximately about 0.5 mm. An exemplary thickness of the heat-generating element 48 may be approximately about 0.06 mm.

Figure 13:
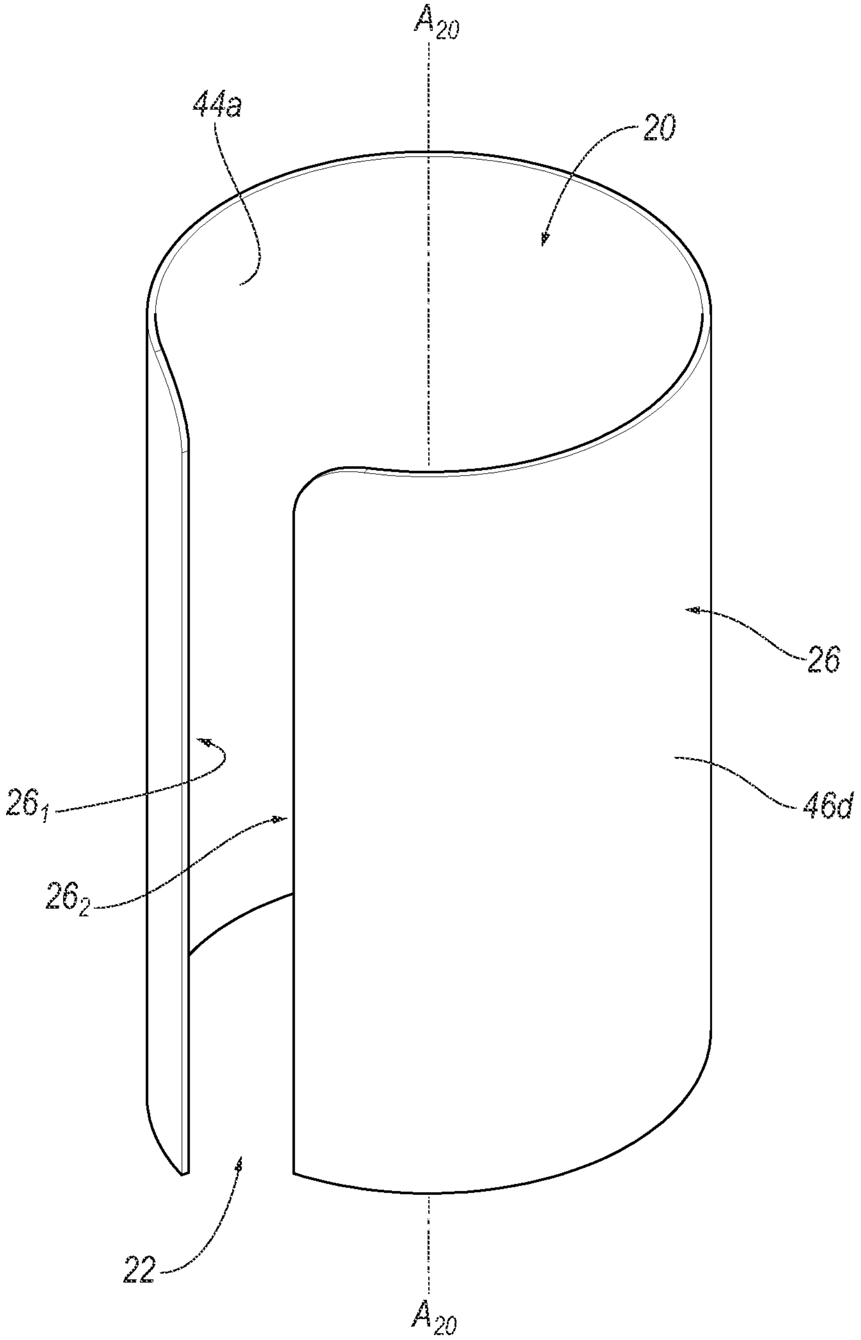
FIG. 13 is a top assembled perspective view of the heater of FIG. 12 arranged in a substantially cylindrical configuration according to the present disclosure.
Figure 14:
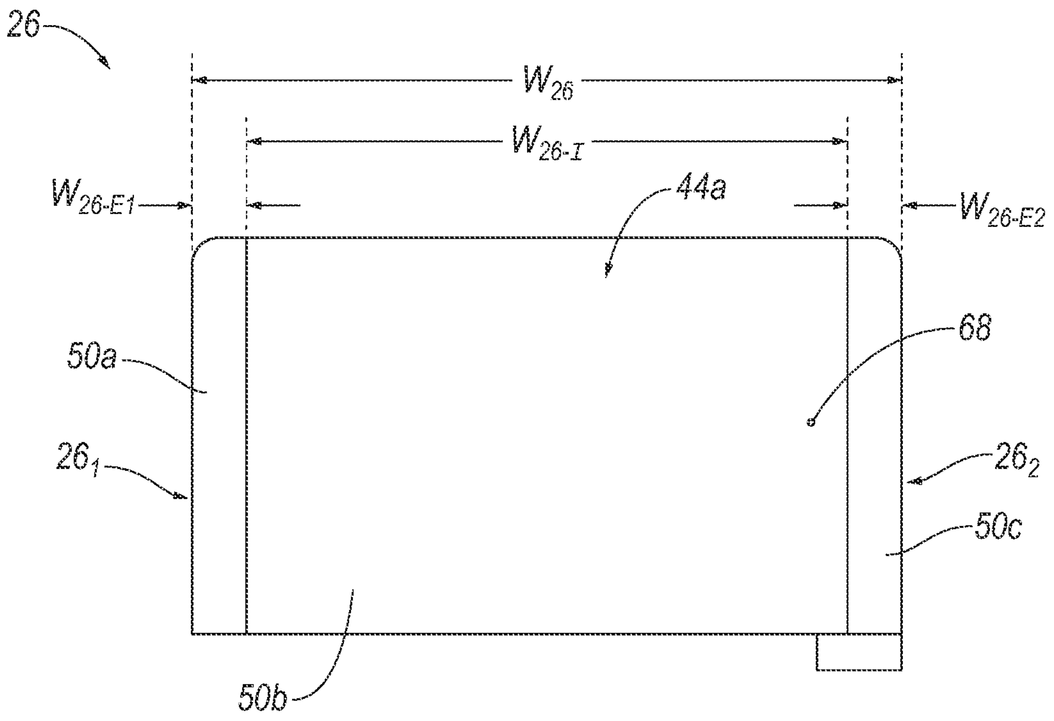
FIG. 14 is an assembled view of the exemplary heater of FIG. 12 arranged in a non-cylindrical, substantially flattened configuration, according to the present disclosure.
Figure 15:
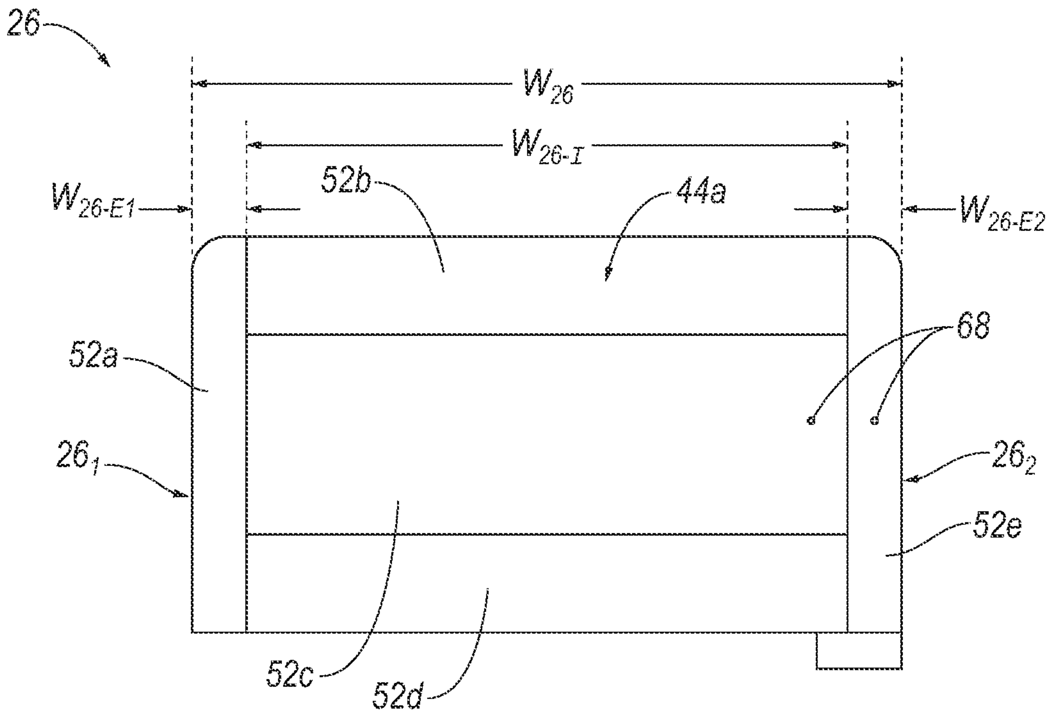
FIG. 15 is an assembled view of another exemplary heater of the sublimation device of FIG. 1 arranged in a non-cylindrical, substantially flattened configuration, according to the present disclosure.

Referring to FIG. 13, an exemplary configuration of the heater 26 is shown that may include the layers 44*a*-44*c*, 46*a*-46*d*, and the heat-generating element 48 of FIG. 12. As seen at FIG. 13, the layers 44*a*-44*c*, 46*a*-46*d*, and the heat-generating element 48, which may originally be formed or arranged to include a flat, substantially rectangular shape, may be disposed adjacent one another and then rolled or bent around an axis (for reference, see, e.g., the central axis $A_{20}$-$A_{20}$ of the cavity for forming a substantially cylindrical or tube-shaped structure that forms the cavity 20. As noted above with reference to previously described implementations, the heater 26 may be also form the gap 22. Referring to FIGS. 14 and 15, in some configurations, the heater 26 may include a temperature sensor 68, such as, for example, a resistive sensor. Exemplary resistive sensors may include, for example, a negative temperature coefficient (NTC) thermistor or positive temperature coefficient (PTC) thermistor. Such exemplary temperature sensors 68 may be disposed at, on, or near a surface of the heater 26 that is configured to be arranged opposite the outer side surface $W_O$ of one of the workpieces $W_1$, $W_2$ of the plurality of differently sized workpieces W (e.g., as seen at FIGS. 14-15, one or more temperature sensors may be arranged on a portion of a surface of the innermost layer 44*a* that is configured to be disposed adjacent the outer side surface $W_O$ of one of the workpieces $W_1$, $W_2$ of the plurality of differently sized workpieces W) in order to detect a temperature of the heater 26 and/or the temperature of the outer side surface $W_O$ of one of the workpieces $W_1$, $W_2$ of the plurality of differently sized workpieces W during the sublimation process. The measured temperature can be communicated to a processor (see, e.g., the processor 1501 of a CPU 150 of the sublimation device 10 at FIG. 22) of the sublimation device 10 in order to provide a temperature control feedback loop that may maintain the heater 26 at a sufficient temperature for a predetermined period of time for providing a successful sublimation of a design A on the outer side surface $W_O$ of one of the workpieces $W_1$, $W_2$ of the plurality of differently sized workpieces W.

With continued reference to FIGS. 14 and 15, two exemplary configurations of the heater 26 are shown; however, in order to described the following function of the exemplary heaters 26, the heaters 26 are not arranged in a substantially cylindrical configuration (e.g., about the central axis $A_{20}$-$A_{20}$ of the cavity 20 as seen at FIG. 13), but, rather, are arranged in a substantially flat orientation for illustrative purposes only. In some implementations, the heater 26 includes a plurality of distinct heat-generating zones (see, e.g., three heat-generating zones 50*a*, 50*b*, and 50*c* of FIG. 14 and five heat-generating zones 52*a*, 52*b*, 52*c*, 52*d*, and 52*e* of FIG. 15). With reference to FIG. 14, the heater 26 includes a first heat-generating zone 50*a*, a second heat-generating zone 50*b*, and a third heat-generating zone 50*c*. The first heat-generating zone 50*a* and the third heat-generating zone 50*c* may extend vertically along, respectively, a first end $\mathbf{26}_1$ and a second end 262 of the heater 26 while the second heat zone 50*b* extends across most of a width $W_{26}$ of the heater 26 as defined by an intermediate width $W_{26}$-1 of the heater 26. Each of the first heat-generating zone 50*a* and the third heat-generating zone 50*c* may be defined by a similar width dimension (see, e.g., widths $W_{26\text{-}E1}$, $W_{26\text{-}E2}$) that extend from, respectively, the first end $\mathbf{26}_1$ and the second end 262 of the heater 26. Although the innermost layer 44*a* is seen at FIG. 14, the plurality of distinct heat-generating zones 50*a*, 50*b*, 50*c* of the heater 26 may arise from the heat-generating element 48 being correspondingly "zoned" with each corresponding zone being controlled by, for example, the processor 1501 in order to provide different temperatures to correspondingly-zoned regions of the outer side surface $W_O$ of one of the workpieces $W_1$, $W_2$ of the plurality of differently sized workpieces W during sublimation. For example, the first heat-generating zone 50*a* and the third heat-generating zone 50*c* may be heated to a first temperature that is greater than a second temperature provided by the second heat-generating zone 50*b*.

When the heater 26 of FIG. 14 is arranged in a substantially cylindrical configuration (e.g., about the central axis $A_{20}$-$A_{20}$ of the cavity 20 as seen at FIG. 13) in order to define the substantially cylindrical cavity 20, the first end $\mathbf{26}_1$ and the second end 262 of the heater 26 define the gap 22, and, as such, the first heat-generating zone 50*a* and the third heat-generating zone 50*c* of the heater 26 extend vertically along, respectively, the first end $\mathbf{26}_1$ and the second end 262 such that the first heat-generating zone 50*a* and the third heat-generating zone 50*c* disposed on either side of the outer side surface $W_O$ of one of the workpieces $W_1$, $W_2$ of the plurality of differently sized workpieces W that is proximate or near the flange portion $W_F$ of one of the workpieces $W_1$, $W_2$ of the plurality of differently sized workpieces W during sublimation. As such, in some instances, the temperature of the first heat-generating zone 50*a* and the third heat-generating zone 50*c* may be higher than that of the second heat-generating zone 50*b* in order to, for example, compensate for conductive heat losses that may occur proximate or near the around the flange portion $W_F$ of one of the workpieces $W_1$, $W_2$ of the plurality of differently sized workpieces W as described above, as well as, for example, convective heat losses due to airflow that may occur at the gap 22. Accordingly, in this exemplary configuration of the heater 26, the comparatively higher temperature of first heat-generating zone 50*a* and the third heat-generating zone 50*c* may result in an even heat distribution across all of the outer side surface $W_O$ of one of the workpieces $W_1$, $W_2$ of the plurality of differently sized workpieces Win the event that the flange portion $W_F$ of one of the workpieces $W_1$, $W_2$ of the plurality of differently sized workpieces W results in a heat loss as discusses above.

Accordingly, a comparatively higher temperature produced at the first heat-generating zone 50*a* and the third heat-generating zone 50*c* achieves the same surface temperature of outer side surface $W_O$ of one of the workpieces $W_1$, $W_2$ of the plurality of differently sized workpieces W as provided by the second heat-generating zone 50*b* where the likelihood of a heat loss or heat sink is lower or non-existent. As such, the exemplary configuration of the heater 26 of FIG. 14 may result in improved distribution of the heat H provided to the outer side surface $W_O$ of one of the workpieces $W_1$, $W_2$ of the plurality of differently sized workpieces W that may result in a sharp, crisp, non-faded, and non-dimmed design A transferred to the outer side surface $W_O$ of one of the workpieces $W_1$, $W_2$ of the plurality of differently sized workpieces W during sublimation.

Although the heat-generating element 48 may be correspondingly "zoned" as described above, other configurations of the heater 26 may include a plurality of separate heat-generating elements 48; in such configurations, the plurality of separate heat-generating elements 48 may be arranged in one layer, or, alternatively, the plurality of separate heat-generating elements 48 may be arranged between the various layers of the plurality of layers defined by the plurality of first material type layers 44*a*-44*c* and the plurality of second material type layers 46*a*-46*d*. In some implementations, one heat-generating element 48 may heat one or more zones of the plurality of distinct heat-generating zones 50*a*, 50*b*, 50*c* and another heat-generating element 48 may heat the other zones of the plurality of distinct heat-generating zones 50*a*, 50*b*, 50*c*. In other configurations, a single heat-generating element 48 may include multiple heating zones that may correspond to each zone of the plurality of distinct heat-generating zones 50*a*, 50*b*, 50*c*, which can be controlled by the processor 1501 in order to produce different temperatures at each zone of the plurality of distinct heat-generating zones 50*a*, 50*b*, 50*c*.

With reference to FIG. 15, the exemplary heater 26 may include a first heat-generating zone 52*a*, a second heat-generating zone 52*b*, a third heat-generating zone 52*c*, a fourth heat-generating zone 52*d*, and a fifth heat-generating zone 52*e*. The first heat-generating zone 52*a* and the fifth heat-generating zone 52*e* may extend vertically along, respectively, the first end $26_1$ and the second end 262 of the heater 26 while the second heat-generating zone 52*b*, the third heat—generating zone 52*c*, and the fourth heat-generating zone 52*d* extend across most of a width $W_{26}$ of the heater 26 as defined by an intermediate width $W_{26}$-1 of the heater 26. Each of the first heat-generating zone 52*a* and the fifth heat-generating zone 52*e* may be defined by a similar width dimension (see, e.g., widths $W_{26\text{-}E1}$, $W_{26\text{-}E2}$) that extend from, respectively, the first end $26_1$ and the second end 262 of the heater 26. Accordingly, the heater of FIG. 15 is substantially similar to the heater 26 of FIG. 15 with the exception that the intermediate width $W_{26\text{-}I}$ of the heater 26 is further subdivided into a upper heat-generating zone (see, e.g., the second heat-generating zone 52*b*), a middle heat-generating zone (see, e.g., the third heat-generating zone 52*c*), and a lower heat-generating zone (see, e.g., the fourth heat-generating zone 52*d*). Accordingly, the second heat-generating zone 52*b* generally corresponds to providing heat H to a portion of the outer side surface $W_O$ proximate or near the upper end surface $W_F$ of one of the workpieces $W_1$, $W_2$ of the plurality of differently sized workpieces W during sublimation whereas the fourth heat-generating zone 52*d* generally corresponds to providing heat H to a portion of the outer side surface $W_O$ proximate or near the lower end surface $W_L$ of one of the workpieces $W_1$, $W_2$ of the plurality of differently sized workpieces W during sublimation. Accordingly, in some implementations, the second heat-generating zone 52*b* may be heated to a higher temperature than that of the third heat-generating zone 52*c* in order to account for convective heat loss from airflow at a portion of the outer side surface $W_O$ proximate or near the upper end surface $W_F$ of one of the workpieces $W_1$, $W_2$ of the plurality of differently sized workpieces W during sublimation; similarly, the fourth heat-generating zone 52*d* may be heated to a higher temperature than that of the third heat-generating zone 52*c* in order to account for convective heat losses and/or conductive heat losses due to contact between the lower end surface $W_L$ of one of the workpieces $W_1$, $W_2$ of the plurality of differently sized workpieces W and the base heater 28 during sublimation.

Furthermore, the exemplary heaters 26 of FIGS. 14 and 15 may be used in conjunction with the base heater 28. Also, dimensions of the heaters 26 of FIGS. 14 and 15, whether relative or absolute, are illustrative only and not meant to be limiting. Any dimensions and size of the overall heaters 26 and/or the plurality of distinct heat-generating zones 50*a*-50*c* or 52*a*-52*e* thereof may be different in one or more other implementations in order to, for example, customize a desired heating H of a particular configuration of any desirable workpiece that may be interfaced with the sublimation device 10.

Figure 16:
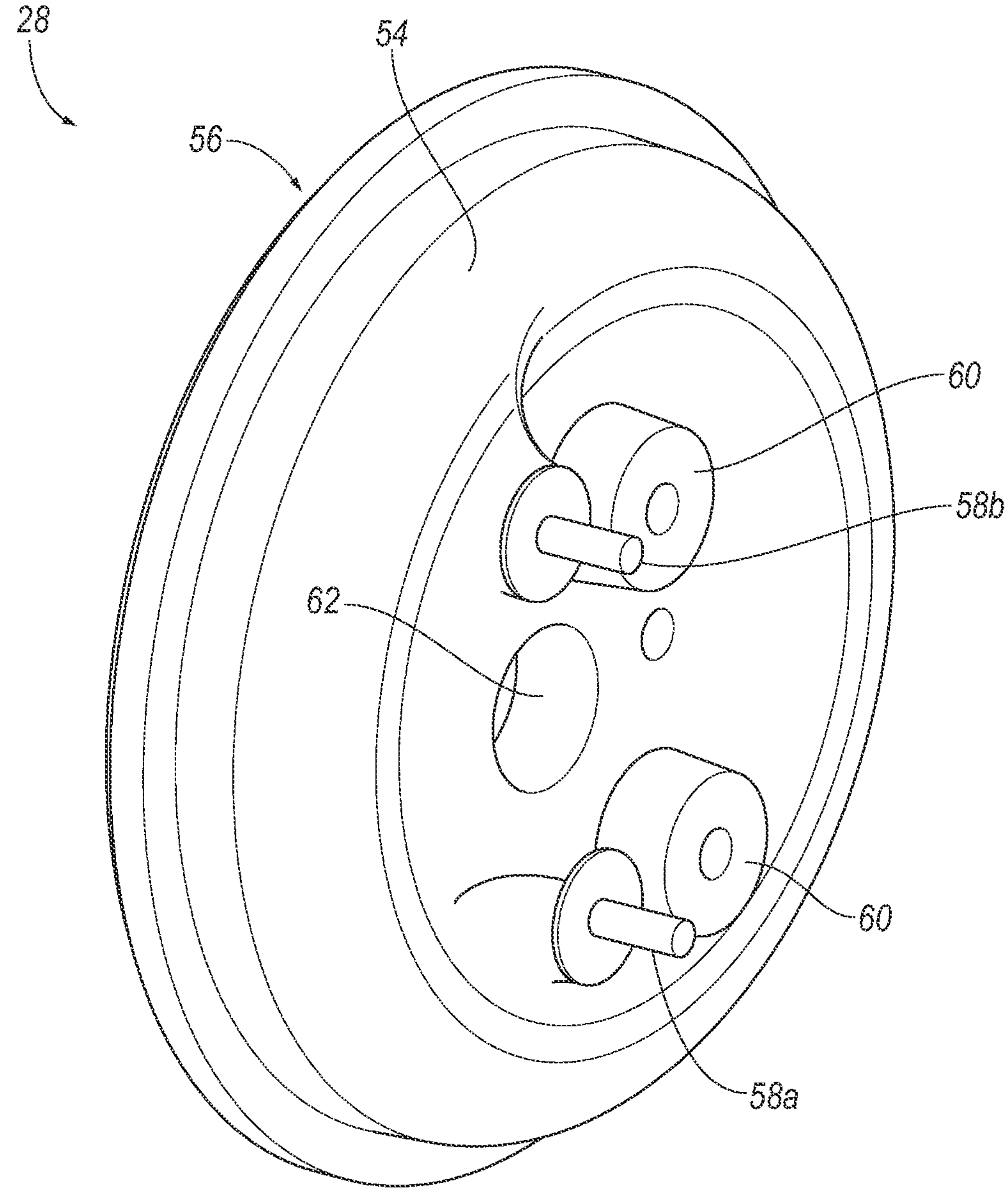
FIG. 16 is a lower perspective view of an exemplary workpiece base heater, according to the present disclosure.
Figure 17:
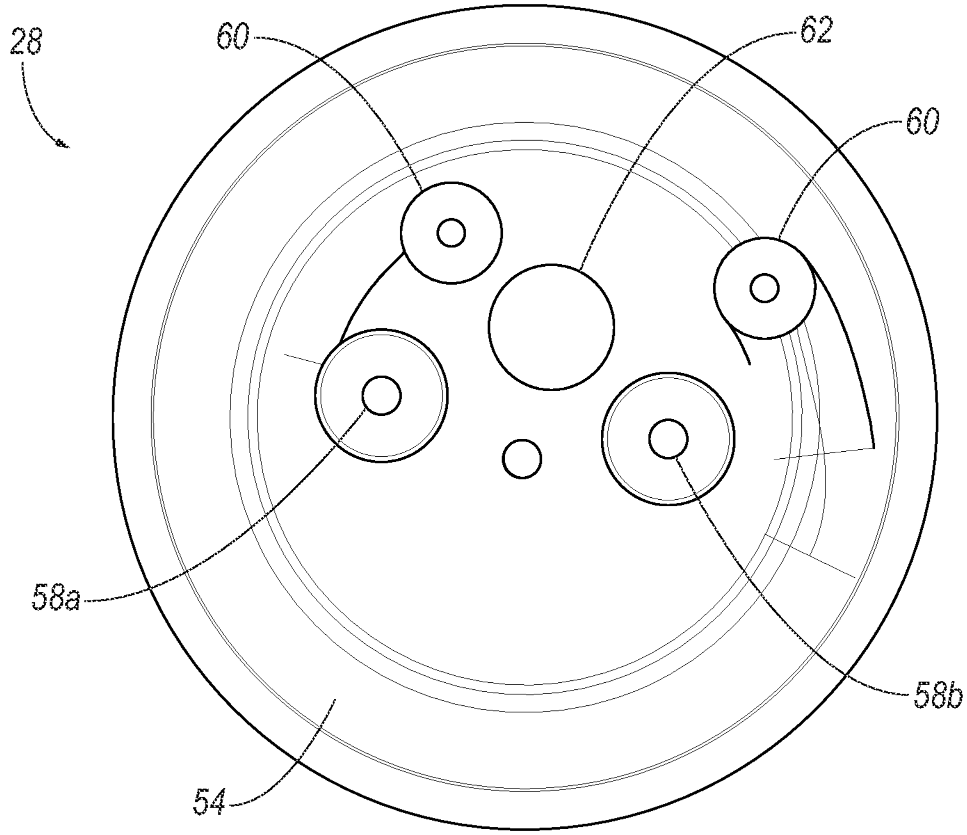
FIG. 17 is a bottom view of the workpiece base heater of FIG. 16.
Figure 18:
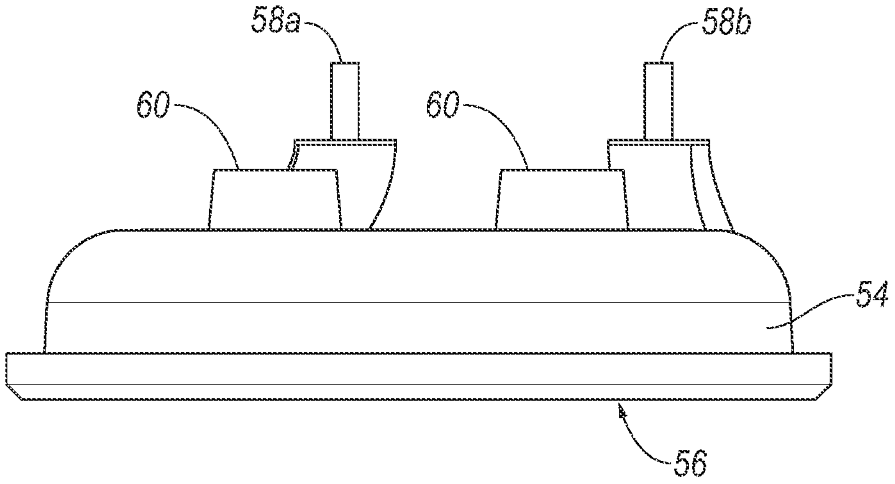
FIG. 18 is a side view of the workpiece base heater of FIG. 16.

Referring to FIGS. 16-18, an exemplary configuration of the base heater 28 is shown. The base heater 28 may include a body 54 with one or more resistive heating coils (not shown) disposed within body 54. In some implementations, the body 54 may include a ceramic material, forming a top surface 56 that is configured to contact the lower end surface $W_L$ of one of the workpieces $W_1$, $W_2$ of the plurality of differently sized workpieces W during sublimation. Electrical terminals 58*a* and 58*b* may also extend outside of the body 54 to provide electrical connections for heating the interior heating coil(s) disposed within body 54.

Furthermore, the base heater 28 may include one or more protrusions 60 and/or one or more cavities 62 into which connection hardware, such as, for example, screws or the like, may be inserted in order to secure the base heater 28 within outer housing 14. In some configurations, the 30) connection hardware may be used to secure the base heater 28 to the outer housing 14 through the insulative barrier 36, with the insulative barrier 36 being disposed beneath the base heater 28 and between the base heater 28 and the outer housing 14. Accordingly, the insulative barrier 36 may include one or more openings through which protrusions 60 and/or connection hardware may extend there through in order to secure the base heater 28 to the outer housing 14.

In some configurations, the insulative barrier 36 may include one or more openings through which one or more terminals 58*a*, 58*b* or electrical wires in communication with terminals 58*a*, 58*b* may extend such that the heating coil(s) of the base heater 28 may be connected to an electrical power. In this way, the power supply, other electronics, or other components of the sublimation device 10 that may power the heating coil(s) of the base heater 28 are separated from the heated body 54 of the base heater 28 by the insulative barrier 36 in order to protect such components from the heat H.

Referring to FIGS. 19A-19H, a method for utilizing the sublimating device 10 is shown. Firstly, as seen at FIG. 19A, the transfer sheet S is shown including the design A formed by the infusible sublimation ink I. In some instances, the crafting machine 100, which is shown arranged upon the table 125, may print and/or cut the design A on and/or into the transfer sheet S; in some examples, a mat may support the transfer sheet S while the crafting machine 100 creates the design A. However, in other implementations, the transfer sheet S is shown including the design A formed by the infusible sublimation ink I may be separately purchased and not formed by the crafting machine 100.

As seen at FIG. 19B, a user may arrange a surface of the transfer sheet that carries the infusible sublimation ink I opposite the outer side surface $W_O$ of one of the workpieces $W_1$, $W_2$ of the plurality of differently sized workpieces W. Then, as seen at FIG. 19C, the user may arrange the infusible sublimation ink I adjacent the outer side surface $W_O$ of one of the workpieces $W_1$, $W_2$ of the plurality of differently sized workpieces W; in such instances, the transfer sheet may include a tacky surface that permits the transfer sheet to be temporarily secured to the outer side surface $W_O$ of one of the workpieces $W_1$, $W_2$ of the plurality of differently sized workpieces W.

Referring to FIG. 19D, after the transfer sheet S is removably-secured to the outer side surface $W_O$ of one of the workpieces $W_1$, $W_2$ of the plurality of differently sized workpieces W, the lower end surface $W_L$ of one of the workpieces $W_1$, $W_2$ of the plurality of differently sized workpieces W may be arranged over the sublimation device and be axially aligned with the about the central axis $A_{20}$-$A_{20}$ of the cavity 20. As seen at FIGS. 19A-19D, the workpiece engagement actuator 16 may be arranged in the first orientation (see also, e.g., FIG. 3) and the workpiece-engaging device 18 may be correspondingly arranged in the disengaged orientation.

Then, as seen at FIG. 19E, after the one of the workpieces $W_1$, $W_2$ of the plurality of differently sized workpieces W is disposed within the cavity 20, the workpiece engagement actuator 16 may be arranged in the second orientation (see also, e.g., FIGS. 4 and 5) in order to cause the workpiece-engaging device 18 to be arranged in the engaged orientation (see also, e.g., FIGS. 4 and 5). Once the workpiece engagement actuator 16 and the workpiece-engaging device 18 are arranged as described above at FIG. 19E, the heater 26 may circumferentially engage the outer side surface $W_O$ of one of the workpieces $W_1$, $W_2$ of the plurality of differently sized workpieces W, applying a radially-inwardly-directed force or pressure P (see, e.g., FIG. 20A) thereto. Furthermore, upon the workpiece engagement actuator 16 and the workpiece-engaging device 18 are arranged as described above at FIG. 19E, the heater 26 may automatically apply heat H (see, e.g., FIG. 20A) to the outer side surface $W_O$ of one of the workpieces $W_1$, $W_2$ of the plurality of differently sized workpieces W. In other configurations, application of the heat H may occur in response to, for example, the user depressing an actuator (see, e.g., the button 12).

The sublimation device 10 may include electronics (see, e.g., the processor 1501 of the CPU 150 at FIG. 22) that may monitor or sense the temperature (e.g., as a result of the temperature sensor 68 that may be communicatively-coupled to the processor 1501) associated with the applied heat H from the heater 26 for determining if the heater 26 should cease providing the heat toward the outer side surface $W_O$ of one of the workpieces $W_1$, $W_2$ of the plurality of differently sized workpieces W. In other implementations, the processor 1501 may include a timer that will also contribute to determining if heat H should continue to be provided by the heater 26, or, if the heat H should no longer be provided by the heater 26.

Figure 19F:
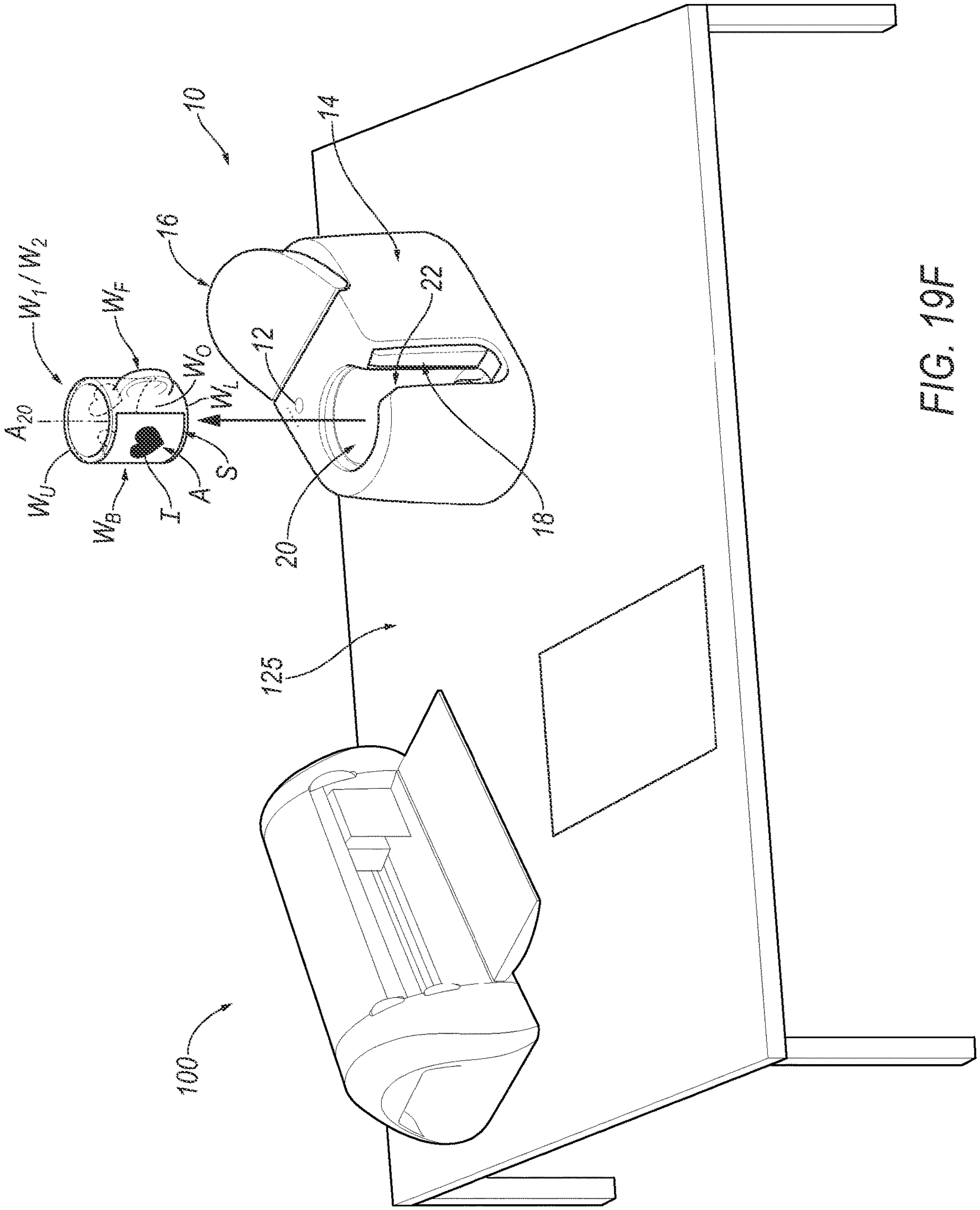

After the processor 1501 determines that the heater 26 should no longer provide heat H, the processor 1501 may electrically deactivate the heater 26 and/or provide an indication (e.g., a sound and/or a flashing light) to a user that the sublimation process is complete. Thereafter, as seen at FIG. 19F, a user may return the workpiece engagement actuator 16 to the first orientation (see also, e.g., FIG. 3) thereby causing the workpiece-engaging device 18 to be returned to the disengaged orientation. Thereafter, the user may remove the one of the workpieces $W_1$, $W_2$ of the plurality of differently sized workpieces W from the cavity 20.

Figure 19G:
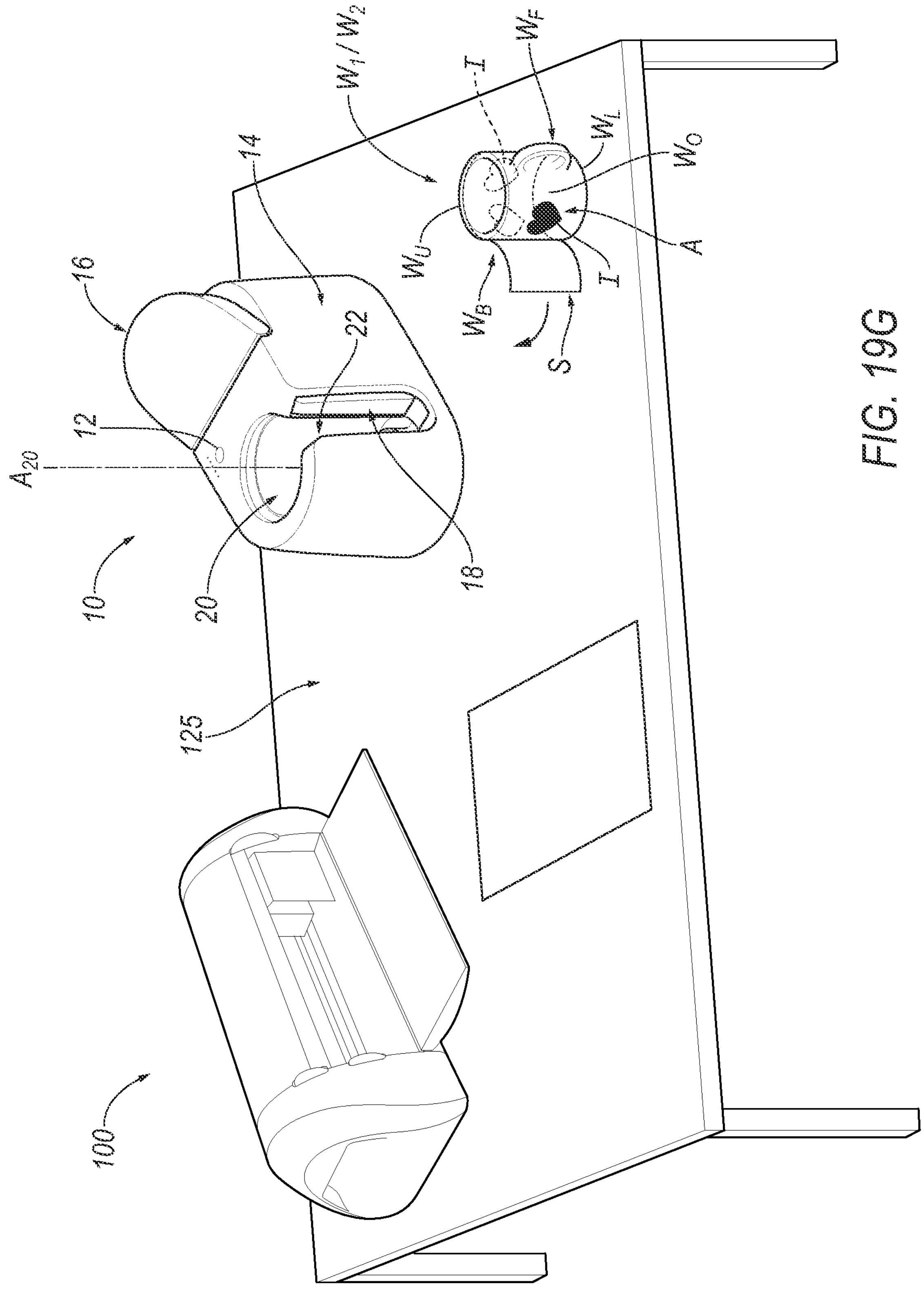
Figure 19H:
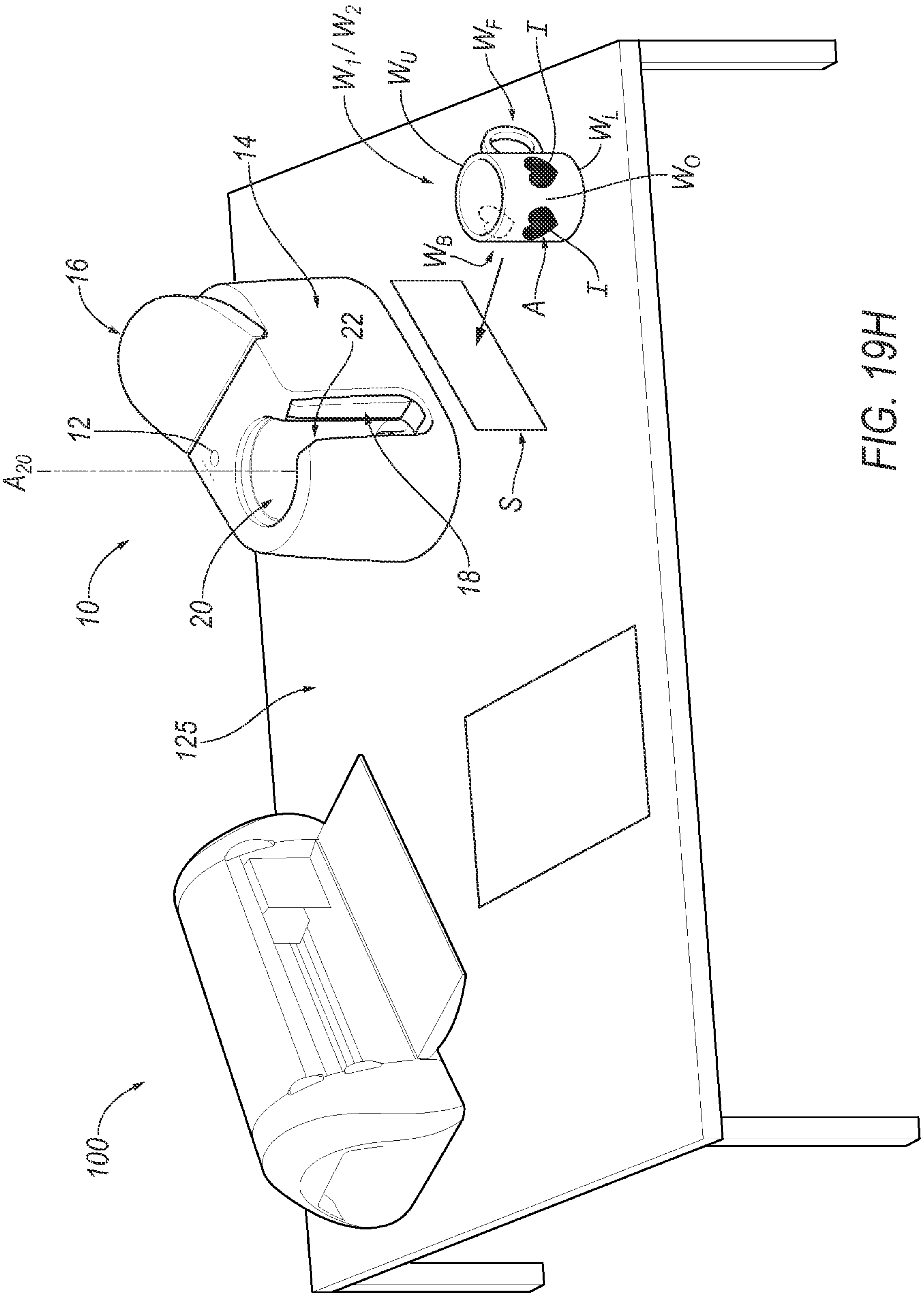

Then, referring to FIG. 19G, the user may peel away the transfer sheet S from the outer side surface $W_O$ of one of the workpieces $W_1$, $W_2$ of the plurality of differently sized workpieces W. As seen at FIGS. 19G and 19H, the design A that is formed by the infusible sublimation ink I is no longer carried by the transfer sheet S, but, rather, is infused into the outer side surface $W_O$ of one of the workpieces $W_1$, $W_2$ of the plurality of differently sized workpieces W.

Referring to FIGS. 20A, 20B, and 21A-21D, exemplary cross-sectional views of infusible sublimation ink I being infused into the outer side surface $W_O$ of one of the workpieces $W_1$, $W_2$ of the plurality of differently sized workpieces W are shown.

Figure 21A:
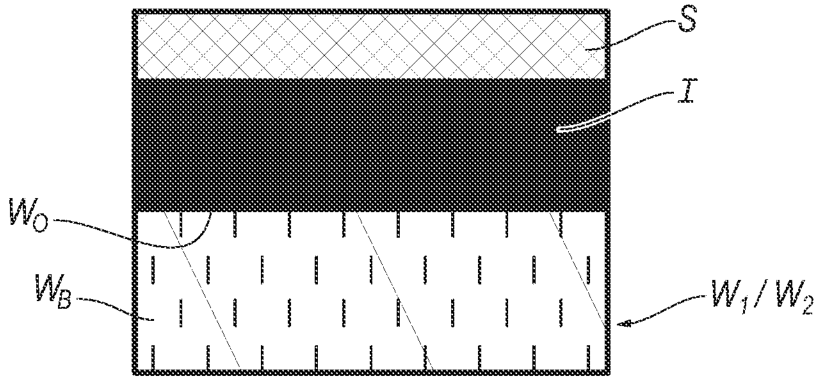
FIG. 21A is an enlarged cross-sectional view according to line 21A of FIG. 20A.
Figure 21B:
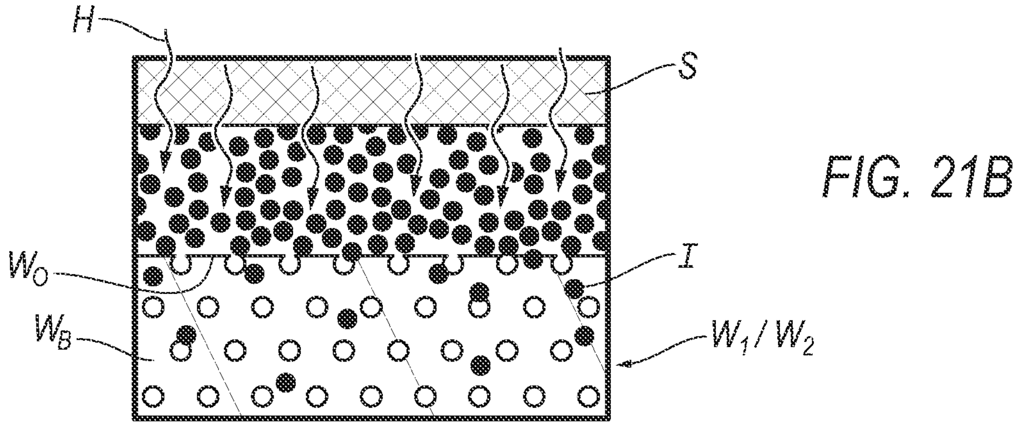
FIG. 21B is an enlarged cross-sectional view according to FIG. 21A illustrating the sublimation device of FIG. 19E that is heating the ink that is secured to the transfer sheet.

As seen at FIGS. 21A-21D, the sublimation device 10 performs the act of "sublimation," which may be defined as a chemical process where a solid material (see, e.g., the infusible sublimation ink I at FIG. 21A) turns into a gas (see, e.g., FIG. 21B) without going through a liquid stage. "Sublimation printing," which may also be referred to as "dye sublimation printing," may be utilized for transferring images onto suitable materials. Upon arranging the transfer sheet S (including the infusible sublimation ink I disposed thereon) proximate the heater 26 that produces heat H (see, e.g., FIG. 20A), the infusible sublimation ink I changes from: (1) a solid state disposed upon the transfer sheet S as seen at FIG. 21A; and then to (2) a gaseous state as seen at FIG. 21B that permeates into, for example, micro-pores in the outer side surface $W_O$ of one of the workpieces $W_1$, $W_2$ of the plurality of differently sized workpieces W (see, e.g., FIGS. 20B and 21B-21D).

Figure 21C:
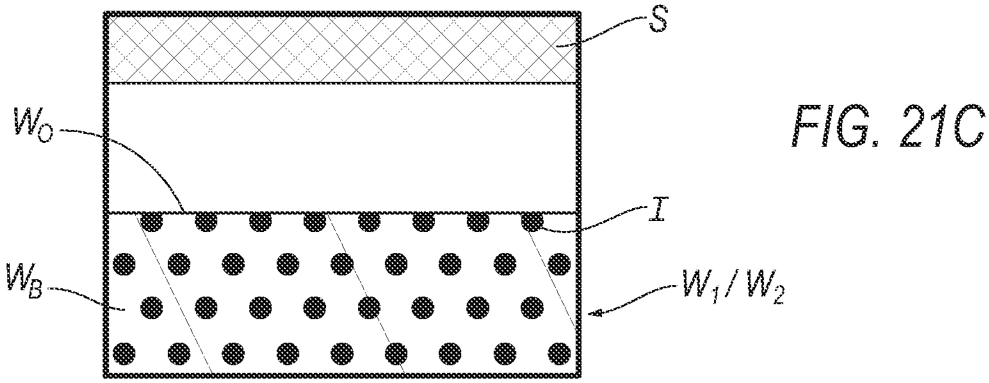
FIG. 21C is an enlarged cross-sectional view according to FIG. 21B illustrating the ink that was previously secured to the transfer sheet and is sublimating into an outer surface of the workpiece.
Figure 21D:
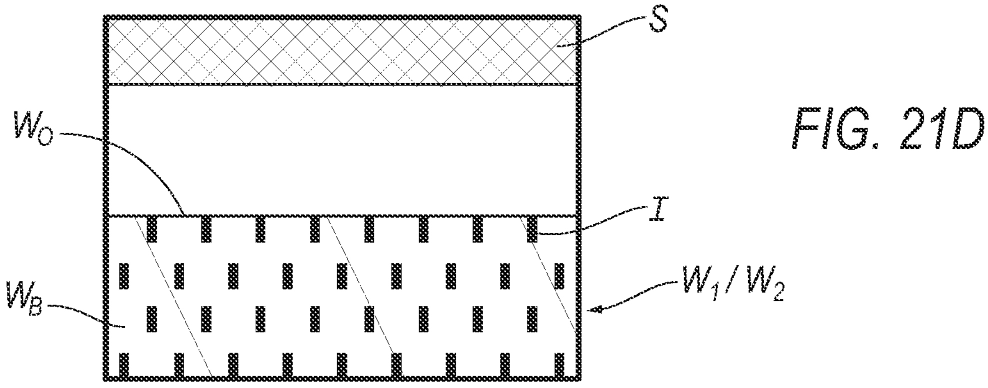
FIG. 21D is an enlarged cross-sectional view according to line 21D of FIG. 20B.

When the heat H is removed from the transfer sheet S and the outer side surface $W_O$ of one of the workpieces $W_1$, $W_2$ of the plurality of differently sized workpieces W, the infusible 20 sublimation ink I that transitioned from a solid state (as seen at, e.g., FIG. 21A) to a gaseous state (as seen at, e.g., FIG. 21B) that permeated into the outer side surface $W_O$ of one of the workpieces $W_1$, $W_2$ of the plurality of differently sized workpieces W (as seen at, e.g., FIGS. 21C-21D) is permanently set into place by within the outer side surface $W_O$ of one of the workpieces $W_1$, $W_2$ of the plurality of differently sized workpieces W (as seen at FIG. 21D). Furthermore, with reference to FIGS. 21A-21B, not only does the heat H change the state of the infusible sublimation ink I, but it may also open, for example, micro-pores of the outer side surface $W_O$ of one of the workpieces $W_1$, $W_2$ of the plurality of differently sized workpieces W that receives the infusible sublimation ink I (as seen at, e.g., FIG. 21C) that changed from a solid state to a gaseous state.

Once the heat H and pressure P is released, the infusible sublimation ink I that is "gassed" into the outer side surface $W_O$ of one of the workpieces $W_1$, $W_2$ of the plurality of differently sized workpieces W returns to the solid state, and, as seen at FIGS. 21C-21D, the micro-pores of the outer side surface $W_O$ of one of the workpieces $W_1$, $W_2$ of the plurality of differently sized workpieces W transitions from the open state back to the closed state, thereby trapping the infusible sublimation ink I within the outer side surface $W_O$ of one of the workpieces $W_1$, $W_2$ of the plurality of differently sized workpieces W as seen at FIG. 21D.

Figure 22:
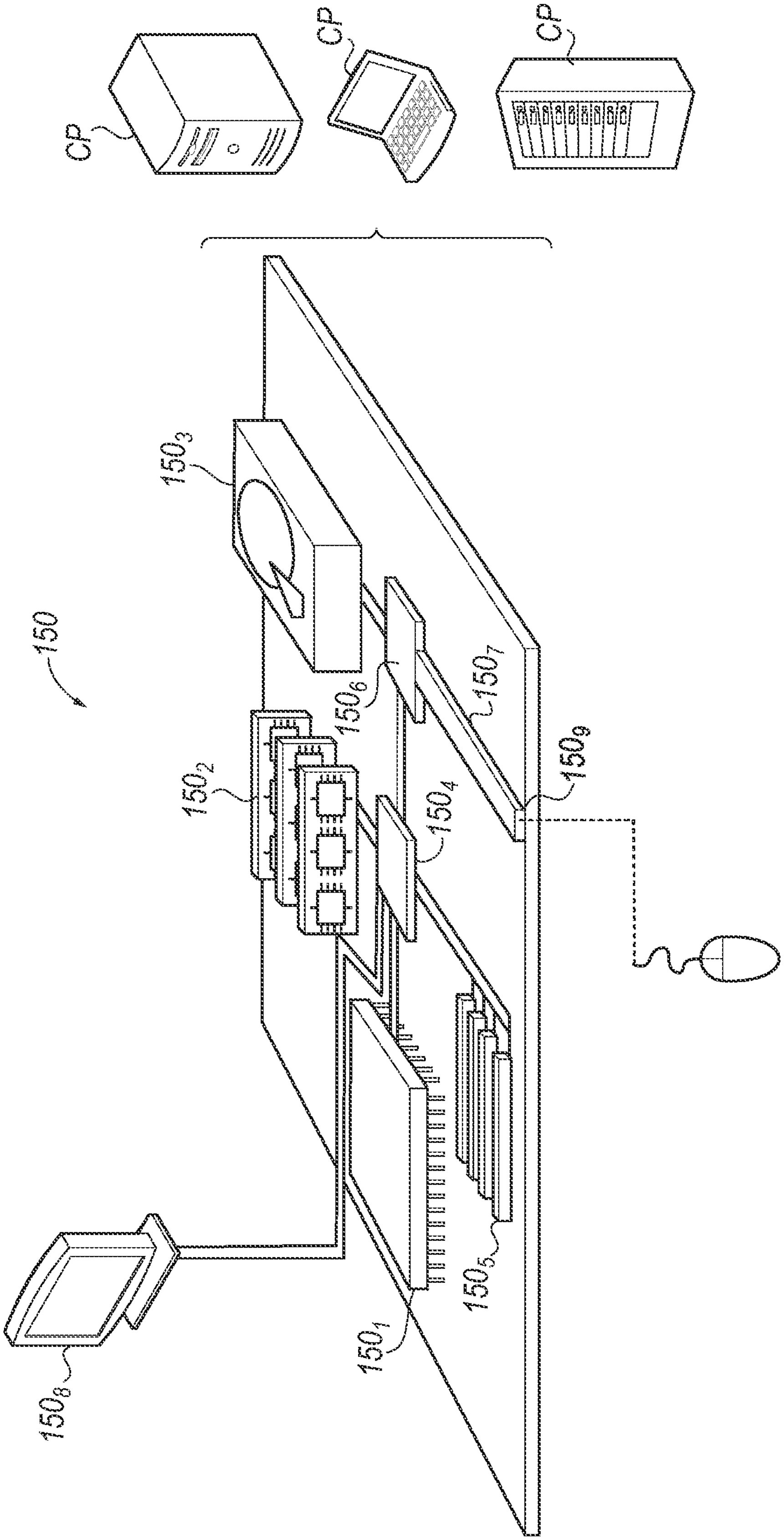
FIG. 22 is a schematic view of an example computing device that may be used to implement the systems and methods described herein.

FIG. 22 is schematic view of an example CPU 150, which may be alternatively referred to as a computing device that may be used to implement the systems and methods described in this document. The components 1501, 1502, 1503, 1504, 150*s*, and 1506 shown at FIG. 22, their connections and relationships, and their functions, are meant to be exemplary only, and are not meant to limit implementations of the disclosure described and/or claimed in this document.

The computing device 150 includes a processor 1501, memory 1502, a storage device 1503, a high-speed interface/controller 1504 connecting to the memory 1502 and high-speed expansion ports 1505, and a low speed interface/controller 1506 connecting to a low speed bus 1507 and a storage device 1503. Each of the components 1501, 1502, 1503, 1504, 1505, and 1506, are interconnected using various busses, and may be mounted on a common motherboard or in other manners as appropriate. The processor 1501 can process instructions for execution within the computing device 150, including instructions stored in the memory 1502 or on the storage device 1503 to display graphical information for a graphical user interface (GUI) on an external input/output device, such as display 1508 coupled to high speed interface 1504. In other implementations, multiple processors and/or multiple buses may be used, as appropriate, along with multiple memories and types of memory. Also, multiple computing devices 150 may be connected, with each device providing portions of the necessary operations (e.g., as a server bank, a group of blade servers, or a multi-processor system).

The memory 1502 stores information non-transitorily within the computing device 150. The memory 1502 may be a computer-readable medium, a volatile memory unit(s), or non-volatile memory unit(s). The non-transitory memory 1502 may be physical devices used to store programs (e.g., sequences of instructions) or data (e.g., program state information) on a temporary or permanent basis for use by the computing device 150. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 1503 is capable of providing mass storage for the computing device 150. In some implementations, the storage device 1503 is a computer-readable medium. In various different implementations, the storage device 1503 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 1502, the storage device 1503, or memory on processor 1501.

The high speed controller 1504 manages bandwidth-intensive operations for the computing device 150, while the low speed controller 1506 manages lower bandwidth-intensive operations. Such allocation of duties is exemplary only. In some implementations, the high-speed controller 1504 is coupled to the memory 1502, the display 1508 (e.g., through a graphics processor or accelerator), and to the high-speed expansion ports 1505, which may accept various expansion cards (not shown). In some implementations, the low-speed controller 1506 is coupled to the storage device 1503 and a low-speed expansion port 1509. The low-speed expansion port 1509, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 150 may be implemented in a number of different forms, as shown in the figure. For example, it may be implemented in one or a combination of the sublimating device 10 and a laptop computer CP.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

As noted above, each of the implementations described in the detailed description above may include any of the features, options, and possibilities set out in the present disclosure, including those under the other independent implementations, and may also include any combination of any of the features, options, and possibilities set out in the present disclosure and figures. Further examples consistent with the present teachings described herein are set out in the following numbered clauses:

The following Clauses provide an exemplary configuration for a mug press and/or related systems or methods described above.

Clause 1: A mug press, comprising: a heater at least partially defining a receptacle; and a base heater disposed at the bottom of the receptacle.

Clause 2: The mug press of clause 1, wherein: the base heater comprises a top surface; and the top surface of the base heater is disposed perpendicular to a major axis of the receptacle.

Clause 3: The mug press of clause 1 or 2, wherein the heater comprises two or more distinct heat zones.

Clause 4: The mug press of clause 3, wherein at least one of the two or more distinct heat zones extends vertically along a side edge of the heater such that the at least one of the two or more heat zones is configured to contact a portion of an outer surface of a mug adjacent to a handle of the mug when the mug is placed into the receptacle during use of the mug press.

Clause 5: The mug press of clause 3 or 4, the heater comprising: a first side heat zone extending vertically along a first side edge of the heater; a second side heat zone extending vertically along a second side edge of the heater; and a middle heat zone disposed between the first and second heat zones.

Clause 6: The mug press of clause 5, wherein the first and second side heat zones are configured to make contact with portions of an outer surface of a mug adjacent to either side of a handle of the mug when the mug is placed into the receptacle during use of the mug press.

Clause 7: The mug press of clause 5 or 6, further comprising a lower heat zone disposed at a bottom edge of the heater and extending between the first and second side heat zones below the middle heat zone.

Clause 8: The mug press of any of clauses 5 through 7, further comprising an upper heat zone disposed at a top edge of the heater and extending between the first and second side heat zones above the middle heat zone.

Clause 9: The mug press of any of clauses 1 through 8, wherein the base heater is configured to contact a bottom surface of a mug when the mug is placed into the receptacle during use.

Clause 10: The mug press of any of clauses 1 through 9, wherein the receptacle is cylindrical.

Clause 11: The mug press of any of clauses 1 through 10, the receptacle comprising a gap through which a handle of a mug can extend when the mug is placed in the receptacle during use of the mug press.

Clause 12: The mug press of any of clauses 1 through 11, wherein the receptacle comprises a cylindrical space that is open at a top thereof and closed at a bottom thereof.

Clause 13: The mug press of clause 12, wherein: the heater forms vertical sidewalls defining at least a portion of the cylindrical space; and an upper surface of the base heater forms a lower surface of the receptacle and defines at least a portion of closed bottom of the cylindrical space.

Clause 14: The mug press of any of clauses 3 through 13, wherein: the heater comprises: two or more layers; and a heating element disposed between two adjacent layers, and the heating element is configured to heat the two or more distinct heat zones separately.

Clause 15: The mug press of clause 14, further comprising two or more heating elements, each heating element configured to heat at least one of the two or more distinct heat zones.

Clause 16: The mug press of any of clauses 1 through 15, further comprising: an outer casing; and an insulative layer disposed between the base heater and the outer casing.

Clause 17: The mug press of clause 16, wherein the insulative barrier is disposed below the base heater.

Clause 18: The mug press of clause 16 or 17, insulative barrier comprising one or more openings through which one or more base heater electrical terminals, connection mechanisms, or electric wires may pass.

Clause 19: The mug press of any of clauses 16 through 18, wherein a power supply or other electronic components in communication with the base heater within the mug press are separated from the base heater by the insulative barrier.

Clause 20: The mug press of clause 1, wherein a diameter of the receptacle is configured to be expanded and contracted to release and clamp down, respectively, onto a mug during use of the mug press.

Clause 21: A sublimation device comprising: a first heater including a proximal end, a distal end disposed opposite the proximal end, and an inner surface extending between the proximal end and the distal end, the inner surface at least partially forming a cavity; and a second heater disposed proximate the distal end of the first heater.

Clause 22: The sublimation device of clause 1, wherein the cavity includes a major axis surrounded by the inner surface of the first heater, wherein the second heater includes a top surface disposed perpendicular to the major axis.

Clause 23: The sublimation device of any of clauses 21 through 22, wherein the first heater includes two or more distinct heat zones.

Clause 24: The sublimation device of clause 23, wherein at least one of the two or more distinct heat zones extend vertically along a side edge of the first heater such that the at least one of the two or more heat zones is configured to contact a portion of an outer surface of a workpiece adjacent to a flange of the workpiece when the workpiece is placed into the cavity.

Clause 25: The sublimation device of any of clauses 23 through 24, wherein the two or more distinct heat zones include: a first side heat zone extending vertically along a first side edge of the first heater; a second side heat zone extending vertically along a second side edge of the first heater; and a middle heat zone disposed between the first side heat zone and the second side heat zone.

Clause 26: The sublimation device of any of clauses 21 through 25, wherein the second heater is configured to face a bottom surface of a workpiece when the workpiece is placed into the cavity.

Clause 27: The sublimation device of any of clauses 21 through 26, wherein the cavity is cylindrical.

Clause 28: The sublimation device of any of clauses 21 through 27, wherein the first heater forms a gap that is configured to receive a flange portion extending from a workpiece when the workpiece is placed into the cavity.

Clause 29: The sublimation device of any of clauses 21 through 28, wherein the cavity is open at the proximal end and closed at the distal end.

Clause 30: The sublimation device of clause 29, wherein: the first heater forms a vertical sidewall defining at least a portion of the cavity; and an upper surface of the second heater defines at least a portion of a closed bottom of the cavity.

Clause 31: The sublimation device of any of clauses 21 through 30, further comprising: an outer casing; and an insulative layer disposed between the second heater and the outer casing.

Clause 32: The sublimation device of clause 31, wherein the insulative layer is disposed below the second heater.

Clause 33: The sublimation device of any of clauses 21 through 32, wherein the second heater is disposed within the cavity.

Clause 34: The sublimation device of any of clauses 21 through 33, wherein the first heater at least partially surrounds the second heater.

Clause 35: A method of sublimating ink on a workpiece, the method comprising: activating a first heater; transmitting, in a first direction, a first heat flow from the first heater during a first time period; activating a second heater; and transmitting, in a second direction, a second heat flow from the second heater during at least a portion of the first time period.

Clause 36: The method of clause 35, wherein the first direction is orthogonal to the second direction.

Clause 37: The method of clause 36, wherein the first direction extends radially, and the second direction extends axially.

Clause 38: The method of any of clauses 36 through 37, wherein the first heater at least partially defines a cavity, the method further comprising disposing a workpiece within the cavity.

Clause 39: The method of any of clauses 36 through 38, further comprising transmitting, in the second direction, a third heat flow from the first heater during the first time period.

Clause 40: The method of clause 39, wherein a first portion of the third heat flow is disposed on a first axial side of the second heater, and a second portion of the third heat flow is disposed on a second axial side of the second heater.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one implementation" or "an implementation" of the present disclosure are not intended to be interpreted as excluding the existence of additional implementations that also incorporate the recited features. Numbers, percentages, ratios, or other values stated herein are intended to include that value, and also other values that are "about" or "approximately" the stated value, as would be appreciated by one of ordinary skill in the art encompassed by implementations of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to implementations disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the implementations that falls within the meaning and scope of the claims is to be embraced by the claims.

The terms "approximately," "about," and "substantially" as used herein represent an amount close to the stated amount that still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

The present disclosure may be embodied in other specific forms without departing from its spirit or essential characteristics. The described implementations are to be considered in all respects only as illustrative and not restrictive. Accordingly, other implementations are within the scope of the following claims, and all changes that come within the meaning and range of equivalency of the claims are to be embraced within their scope.

The invention claimed is:

1. A device comprising:

a workpiece-engaging component comprising a heater, wherein the workpiece-engaging component defines a first gap and has a tube-shaped structure that at least partially defines a cylindrical cavity, wherein the cylindrical cavity comprises a central axis and the tube-shaped structure defines a length that extends along the central axis from a first end of the tube-shaped structure to a second end of the tube-shaped structure; and an outer housing extending along the central axis from a first surface of the outer housing to a second surface of the outer housing, the outer housing defining a second gap that is substantially aligned with the first gap, wherein the first end of the tube-shaped structure and the second end of the tube-shaped structure are each axially disposed between the first surface of the outer housing and the second surface of the outer housing, wherein the workpiece-engaging component is configured to selectively move relative to the outer housing, and wherein a circumferential dimension of the second gap is fixed and thus remains unchanged in response to the workpiece-engaging component moving relative to the outer housing.

2. The device of claim 1, wherein the first end of the tube-shaped structure defines a first opening and the second end of the tube-shaped structure, opposite the first end, defines a second opening.

3. The device of claim 2, wherein the first gap extends entirely along the length of the tube-shaped structure of the workpiece-engaging component and thus extends continuously between the first opening and the second opening.

4. The device of claim 1, wherein the workpiece-engaging component is configured to selectively move relative to the second gap.

5. The device of claim 1, further comprising an actuator configured to be actuated by a user, wherein the workpiece-engaging component is configured to selectively move relative to the outer housing in response to actuation by the user.

6. The device of claim 5, wherein a trim surface of the outer housing defines the second gap, wherein at least the trim surface is static in response to actuation of the actuator by the user.

7. The device of claim 1, wherein the workpiece-engaging component is configured to selectively expand radially to transition to an open orientation and to selectively contract radially to transition to a closed orientation.

8. The device of claim 7, wherein a first circumferential dimension of the first gap in the closed orientation is less than the first circumferential dimension of the first gap in the open orientation.

9. The device of claim 8, wherein the circumferential dimension of the second gap comprises a second circumferential dimension of the second gap that is fixed and thus remains unchanged in response to the workpiece-engaging component transitioning between the open orientation and the closed orientation.

10. The device of claim 1, wherein the workpiece-engaging component comprises parallel ends that collectively define the first gap, wherein at least one end of the parallel ends is configured to selectively engage a flange portion of a workpiece.

11. The device of claim 1, wherein the first gap extends parallel to the central axis.

* * * * *